US009459394B2

(12) United States Patent
Matsukawa

(10) Patent No.: US 9,459,394 B2
(45) Date of Patent: Oct. 4, 2016

(54) LIGHTING DEVICE, DISPLAY DEVICE AND TELEVISION DEVICE

(71) Applicant: Sharp Kabushiki Kaisha, Osaka-shi, Osaka (JP)

(72) Inventor: Toshikazu Matsukawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 70 days.

(21) Appl. No.: 14/409,114

(22) PCT Filed: Jul. 12, 2013

(86) PCT No.: PCT/JP2013/069106
§ 371 (c)(1),
(2) Date: Dec. 18, 2014

(87) PCT Pub. No.: WO2014/013944
PCT Pub. Date: Jan. 23, 2014

(65) Prior Publication Data
US 2015/0146110 A1    May 28, 2015

(30) Foreign Application Priority Data

Jul. 20, 2012   (JP) .................................. 2012-161514

(51) Int. Cl.
*H04N 5/64*        (2006.01)
*H04N 5/66*        (2006.01)
*G02F 1/133*       (2006.01)
(Continued)

(52) U.S. Cl.
CPC ............ *G02B 6/0021* (2013.01); *G02B 6/0085* (2013.01); *G02B 6/0091* (2013.01); *G02F 1/1336* (2013.01); *H04N 5/64* (2013.01); G02F 1/133615 (2013.01); G02F 2001/133628 (2013.01); H04N 5/66 (2013.01)

(58) Field of Classification Search
CPC ........ H04N 5/64; H04N 5/66; G02B 6/0091; G02B 6/0021; G02B 6/0085; G02F 1/1336; G02F 2001/133628; G02F 1/133615
See application file for complete search history.

(56) References Cited

U.S. PATENT DOCUMENTS

2004/0252501 A1* 12/2004 Moriyama ................ F21K 9/17
                                                    362/238
2008/0084710 A1*  4/2008 Ohno ..................... G02B 6/002
                                                    362/621

(Continued)

FOREIGN PATENT DOCUMENTS

JP        2008-097877 A      4/2008

*Primary Examiner* — Brian Yenke
*Assistant Examiner* — Sean Haiem
(74) *Attorney, Agent, or Firm* — Keating & Bennett, LLP

(57) ABSTRACT

A backlight unit 24 includes a light guide plate 20, a heat dissipation member 36, a LED board 30, and LEDs 27 mounted on the LED board 30. The light guide plate 20 includes a light exit surface 20b on a front surface thereof, an opposite surface 10c on a rear surface thereof, a groove 20d in the opposite surface 20c, a light entrance surface 20d1 on one side surface in the groove 20d, and an opposite side surface 20d3 on another side surface in the groove 20d. The heat dissipation member 36 includes a portion in contact with the opposite side surface 20d3 and a portion on a side of one edge surface 20a of the light guide plate 20 with the one edge surface being opposite to the opposite side surface 20d3, the heat dissipation member 36 holding a part of the light guide plate 20 between the portions thereof. The light source board 30 is arranged on a surface that is opposite to a surface of the portion of the heat dissipation member 36 that is in contact with the opposite side surface 20d3.

19 Claims, 18 Drawing Sheets

(51) Int. Cl.
  *G02B 6/00* (2006.01)
  *F21V 8/00* (2006.01)
  *G02F 1/1335* (2006.01)

(56) References Cited

U.S. PATENT DOCUMENTS

| | | | | |
|---|---|---|---|---|
| 2010/0141865 A1* | 6/2010 | Jung | ............... | G02F 1/133615 349/61 |
| 2011/0080532 A1* | 4/2011 | Ouchi | ............... | G02B 6/008 348/739 |
| 2011/0305003 A1* | 12/2011 | Lee | ............... | G02B 6/0021 362/97.1 |
| 2012/0169969 A1* | 7/2012 | Liu | ............... | G02B 6/0021 349/65 |
| 2015/0362652 A1* | 12/2015 | Hayashi | ............... | G02B 6/005 362/607 |

* cited by examiner

LIGHTING DEVICE, DISPLAY DEVICE AND TELEVISION DEVICE

TECHNICAL FIELD

The present invention relates to a lighting device, a display device and a television device.

BACKGROUND ART

In recent years, displays in image display devices, such as television devices, are being shifted from conventional cathode-ray tube displays to thin display devices using thin displays, such as liquid crystal panels and plasma display panels. With the thin displays, thicknesses of the image display devices can be decreased. Liquid crystal panels used for the liquid crystal display device do not emit light. Therefore, liquid crystal display devices including liquid crystal panels require backlight devices. An edge-light type backlight device has been known as an example of such a backlight device. In the edge-light type backlight device, a light entrance surface is included on a side surface of a light guide plate and light sources such as LEDs are arranged near the side surface of the light guide plate.

In the above edge-light type backlight device, the light guide plate may thermally expands or shrinks due to heat generated near the light sources and this may change a distance between the light sources and the light entrance surface of the light guide plate. In a configuration in which a light source board is held to a casing such as a chassis and a plurality of light sources are arranged on the light source board, if precision in size of the casings may vary, variation occurs in a distance between components on the surface of the light source board and the light entrance surface of the light guide plate. Accordingly, a distance between each light source and the light entrance surface of the light guide plate may not be constant. If the distance between each light source and the light entrance surface of the light guide plate is not kept constant, light entrance efficiency of light from the light sources being incident on the light entrance surface of the light guide plate may vary, and good optical properties are not maintained.

Patent Document 1 describes an edge-light type planar light lighting device in which variations in the distance between the light guide plate and the light entrance surface are less likely to occur. In such a planar light lighting device, a transparent spacer is arranged between the light sources and the light entrance surface. With such a configuration, a distance between the light sources and the light entrance surface is fixed and the distance between the light sources and the light entrance surface is maintained constant.

RELATED ART DOCUMENT

Patent Document

Patent Document 1: Japanese Unexamined Patent Application Publication No. 2008-097877

Problem to be Solved by the Invention

However, in the planar light lighting device according to the Patent Document 1, since the transparent spacer is arranged between the light sources and the light entrance surface of the light guide plate, light from the light sources being directed toward the light entrance surface passes through the transparent spacer. This may decrease brightness of light that enters the light guide plate through the light entrance surface. Therefore, good optical properties may not be maintained.

Disclosure of the Present Invention

A technology disclosed herein was made in view of the above circumstances. An object of the technology disclosed herein is to provide a lighting device that is less likely to be affected by thermal expansion and thermal shrinkage of a light guide plate or variations in size precision of a casing and that maintains good optical properties.

Means for Solving the Problem

A technology disclosed herein relates to a lighting device including a light guide plate having a plate shape, a holding member, a light source board, and a light source. The light guide plate includes a light exit surface on one plate surface thereof, an opposite surface on another plate surface thereof, a groove in one of the light exit surface and the opposite surface, the groove extending along an edge of a plate surface of the light guide plate, a light entrance surface on one inner side surface of the groove, and an opposite side surface on another inner side surface of the groove. The holding member includes a portion being in contact with the opposite side surface, and a portion being on a side of one edge surface of the light guide plate. The one edge surface is opposite to the opposite side surface having a part of the light guide plate between the one edge surface and the opposite side surface, and the holding member holds the part of the light guide plate between the portions thereof. The light source board is arranged on a surface of the portion of the holding member that is in contact with the opposite side surface, and the light source board is arranged on the surface that is opposite to a surface of the portion that is in contact with the opposite side surface. The light source is arranged on the light source board with a light emission surface thereof facing the light entrance surface.

According to such a lighting device, the holding member holds a part of the light guide plate and the holding member and the light source board are attached to the light guide plate. Accordingly, the light guide plate and the light source mounted on the light source board are provided as an integral unit. In such a state, the light source arranged on the opposite side surface side in the groove are opposed to the light entrance surface that is opposite to the opposite side surface. Therefore, light emitted from the light source is directed toward the light entrance surface. The holding member that is attached to the light guide plate moves according to the thermal expansion or the thermal shrinkage of the light guide plate. Therefore, the distance between the light source and the light entrance surface does not change before and after the thermal expansion or the thermal shrinkage even if the light guide plate thermally expands or shrinks. Further, the light source and the light source board are not attached to a casing but to the light guide plate. Therefore, the distance between the light source and the light entrance surface is less likely to be affected by the variations in size precision of the casing and the distance between the light source and the light entrance surface is maintained constant. As a result, the light entrance efficiency of light emitted from the light source and being incident on the light entrance surface is maintained constant and the optical properties of the lighting device are improved. The lighting device is less likely to be affected by thermal expansion or thermal shrinkage of the light guide plate or the variations in size precision of the casing, and good optical properties are maintained.

The lighting device may further include a first reflection sheet arranged to be in contact with the opposite plate surface, and the one edge surface of the light guide plate may gave light reflectivity.

According to such a configuration, light traveling toward the opposite plate surface is reflected by the first reflection sheet toward the light entrance surface. Further, light traveling toward the one edge surfaces is reflected by the one edge surface and directed toward the light entrance surface. As a result, brightness of the lighting device is improved.

The lighting device may further include a second reflection sheet between the one edge surface and the holding member, and the second reflection sheet may be in contact with the one edge surface of the light guide plate.

According to such a configuration, the one edge surface of the light guide plate has light reflectively.

The lighting device may further include a third reflection sheet being in contact with another edge surface of the light guide plate, and the other edge surface may be an opposite to the one edge surface.

According to such a configuration, light travelling through the light guide plate and directed toward the other edge surface is reflected by the third reflection sheet toward the light exit surface side. Accordingly, brightness of the lighting device is improved.

The holding member may include a first contact portion being in contact with the opposite side surface, a second contact portion being in contact with one edge surface of the light guide plate, and a connecting portion connecting the first contact portion and the second contact portion.

Accordingly, a configuration that holds a portion of the light guide plate between the first contact portion and the second contact portion is provided.

The holding member may further include a third contact portion that is in contact with a part of another one of the light exit surface and the opposite plate surface, and the other one of the light exit surface and the opposite plate surface may be a surface opposite to the one having the groove.

According to such a configuration, apart of the light guide plate is sandwiched by the connecting portion and the third contact portion with respect to a thickness direction of the light guide plate. Therefore, the holding member is less likely to be detached from the light guide plate. Therefore, the holding member is attached to the light guide plate without using another fixing member such as screws or adhesive tapes.

The lighting device may further include an optical member on the light exit surface. The opposite plate surface may have the groove. The holding member may further include an extended portion extending from a part of the third contact portion toward a side opposite to the second contact portion, and the optical member may have a fitting recess on a portion thereof corresponding to the extended portion so as to be fitted to the extended portion.

According to such a configuration, the extended portion is fitted to the recess of the optical member, and the optical member is less likely to move in a plate surface direction of the light guide plate.

The holding member may further include a cover portion extending from a connection portion between the first contact portion and the connecting portion to cover an opening of the groove.

According to such a configuration, light emitted from the light source and directed toward an opening of the groove is less likely to leak outside the light guide plate by the cover portion.

The opposite plate surface may have the groove, and the first reflection sheet may extend to cover an opening of the groove.

According to such a configuration, by extending the first reflection sheet, light emitted from the light source and directed toward the opening of the groove is reflected by the extended portion of the first reflection sheet toward the light entrance surface of the light guide plate without using other components. Accordingly, light entrance efficiency of light emitted from the light source and being incident on the light entrance surface is improved.

The lighting device may further include a fourth reflection sheet covering the opening of the groove.

According to such a configuration, light emitted from the light source and directed toward the opening of the groove is reflected by the fourth reflection sheet toward the light entrance surface of the light guide plate. Accordingly, light entrance efficiency of light emitted from the light source and being incident on the light entrance surface is improved.

The holding member may slidably move in a direction in which the groove extends.

According to such a configuration, the holding member is easily mounted on the light guide plate by sliding the holding member along the groove from a side surface of the light guide plate.

The holding member may have heat dissipation property.

According to such a configuration, heat generated in the vicinity of the light source is dissipated effectively to the casing side via the holding member. Accordingly, the heat generated in the vicinity of the light source is less likely to be transferred to the light guide plate side, and thermal expansion or thermal shrinkage is less likely to occur in the light guide plate.

A display device according to the present technology includes the above lighting device and a display panel displaying with using light from the lighting device.

According to such a display device, light use efficiency is improved in the lighting device that supplies light to the display panel, and display with high brightness and excellent display quality is achieved.

The display panel may be a liquid crystal panel. The display device as a liquid crystal display device has a variety of applications, such as a television display or a personal-computer display. In particular, it is suitable for a large screen display.

Advantageous Effect of the Invention

According to the technology disclosed herein, the lighting device is less likely to be affected by thermal expansion and thermal shrinkage of a light guide plate or variations in size precision of a casing and therefore, good optical properties are maintained.

MODE FOR CARRYING OUT THE INVENTION

First Embodiment

A first embodiment will be described with reference to the drawings. X-axis, Y-axis and Z-axis are indicated in some drawings. The axes in each drawing correspond to the respective axes in other drawings. The Y-axis direction matches a vertical direction and the X-axis direction matches a horizontal direction. An upper side and a lower side are described with reference to the vertical direction if there is no special note.

Figure 1:
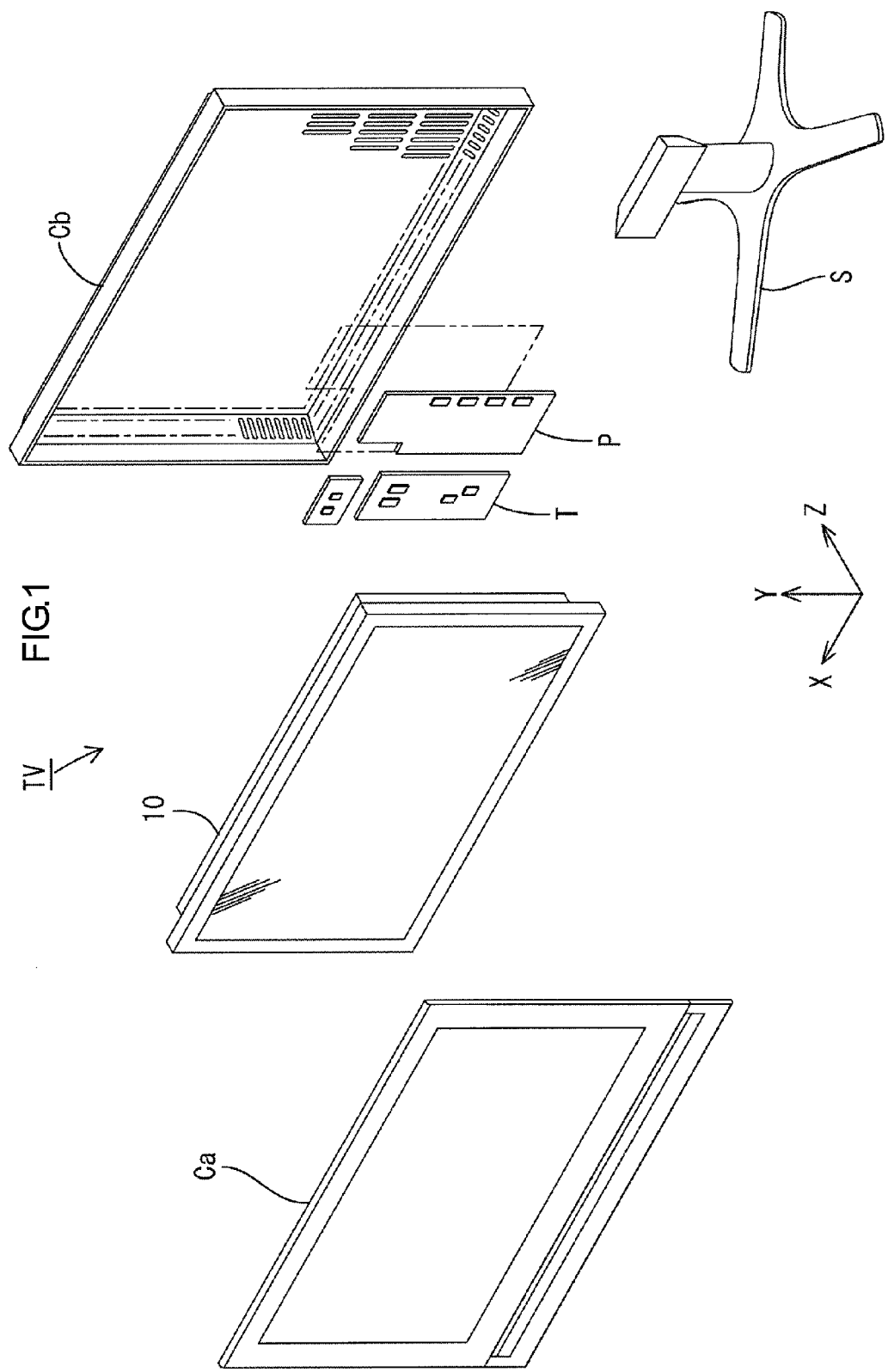
FIG. 1 is an exploded perspective view of a television device according to a first embodiment.
Figure 2:
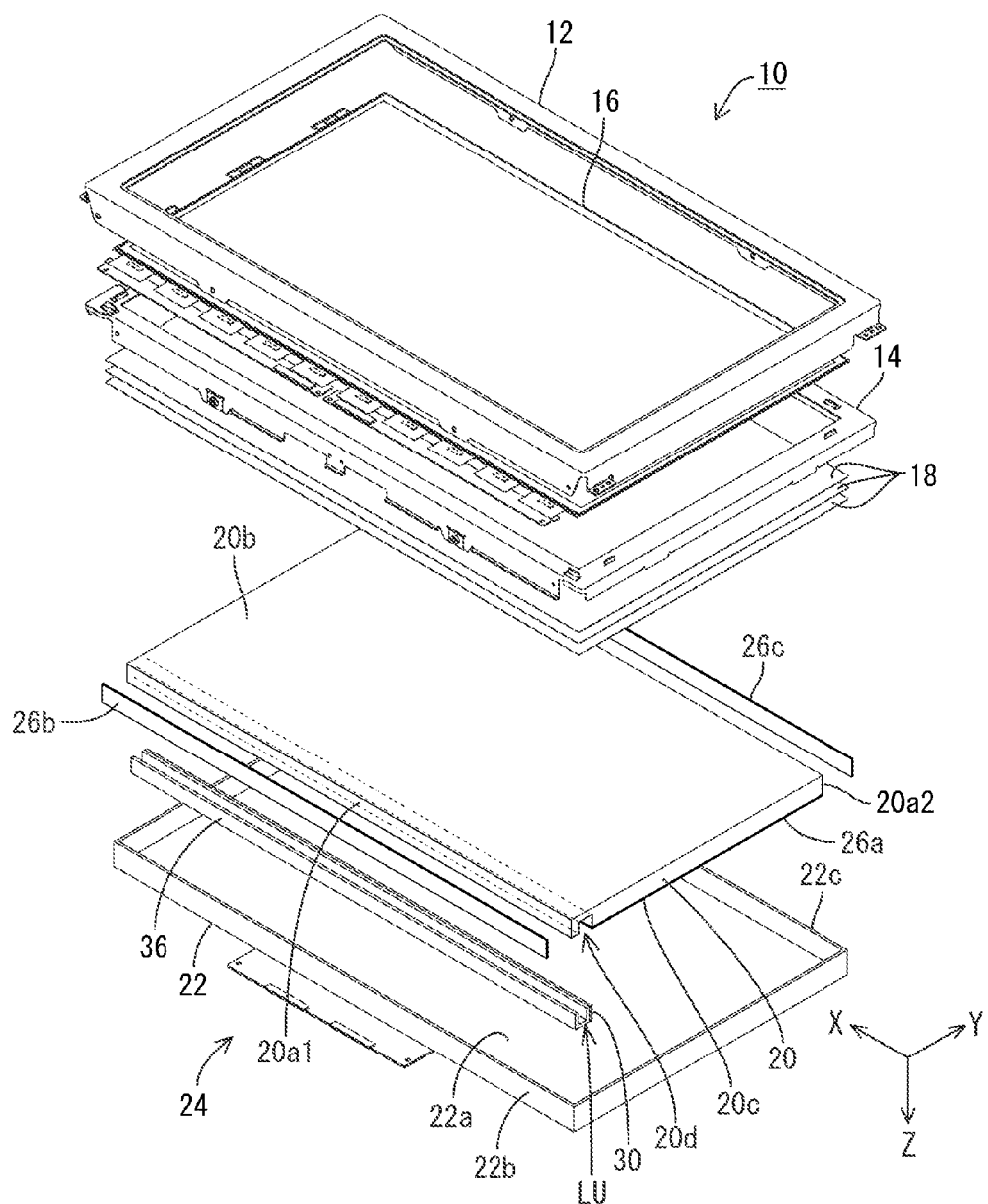
FIG. 2 is an exploded perspective view of a liquid crystal display device 10.

A television device TV includes a liquid crystal display device (an example of a display device) 10, front and rear cabinets Ca and Cb that hold the liquid crystal display device 10 therebetween, a power source P, a tuner T, and a stand S. An upper side in FIG. 2 matches a front side and a lower side in FIG. 2 matches a rear side. As illustrated in FIG. 2, an overall shape of the liquid crystal display device 10 is landscape rectangular (longitudinal). As illustrated in FIG. 2, the liquid crystal display device 10 includes a liquid crystal panel 16 as a display panel and a backlight unit (an example of a lighting device) 24 as an external light source. The liquid crystal panel 11 and the backlight unit 12 are held with a bezel 12 having a frame-like shape.

Next, a liquid crystal panel 16 will be described. The liquid crystal panel 16 includes a pair of glass substrates and a liquid crystal layer. The transparent glass substrates (having high light transmissivity) are bonded together with a predetermined clearance therebetween. A liquid crystal layer (not illustrated) is sealed between the substrates. On one of the substrates, switching components (e.g., TFTs), pixel electrodes, and an alignment film are arranged. The switching components are connected to source lines and gate lines that are perpendicular to each other. The pixel electrodes are connected to the switching components. On the other substrate, a color filter, counter electrodes, and an alignment film are arranged. The color filter has color sections such as R (red), G (green) and B (blue) color sections that are arranged in a predetermined pattern. Image data and various control signals that are required for displaying images are supplied from a driving circuit board, which is not illustrated, to the source lines, gate lines and the counter electrodes. Polarizing plates (not illustrated) are arranged on outer sides of the glass substrates.

Figure 3:
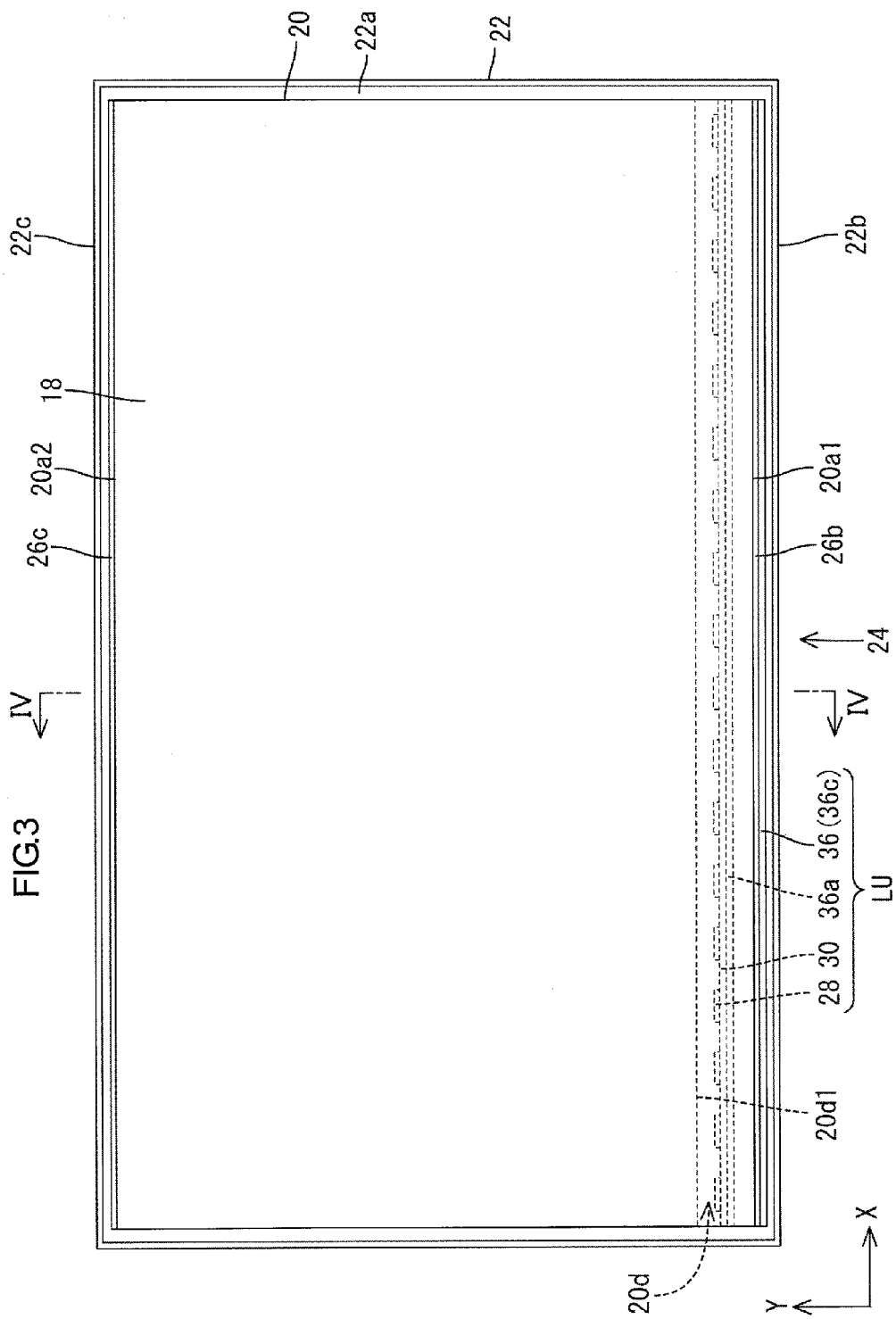
FIG. 3 is a plan view of a backlight unit 24.
Figure 4:
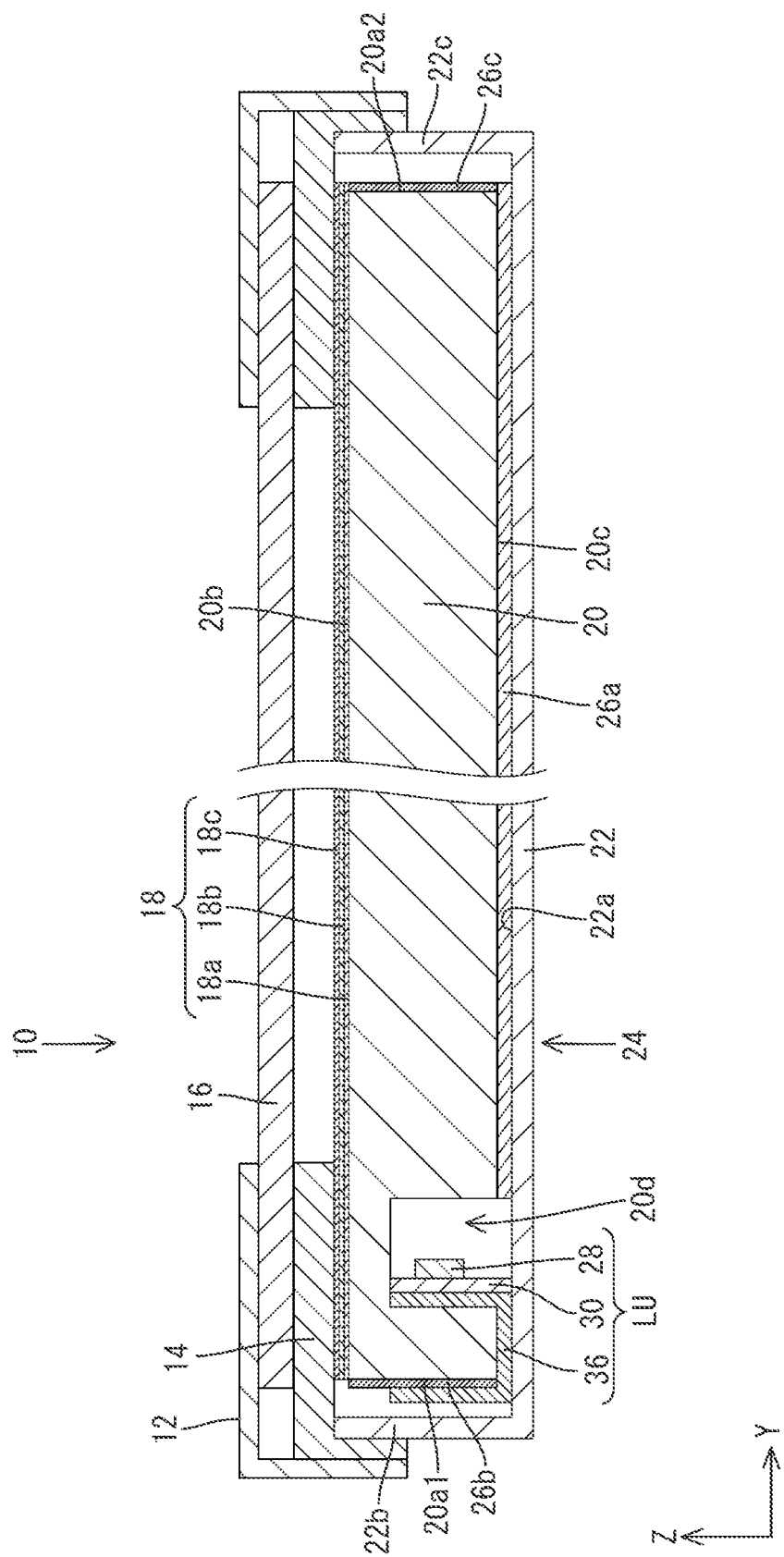
FIG. 4 is a cross-sectional view of the liquid crystal display device 10 taken along line IV-IV in FIG. 3.

Next, the backlight unit 24 will be described. FIG. 4 illustrates a cross-sectional configuration taken along line IV-IV in FIG. 3 and illustrates a cross-sectional view of the liquid crystal display device 10 taken along the vertical direction (the Y-axis direction). As illustrated in FIGS. 2 and 4, the backlight unit 24 includes an optical member 18, a frame 14, a chassis 22, and a LED unit LU. The frame 14 has a frame-like shape and arranged on a front surface (a light exit surface 20b) of a light guide plate 20 to extend along an edge of the light guide plate 20 to support the liquid crystal panel 16 along its inner edge. The optical member 18 is placed on the light exit surface 20b that is a front side surface of the light guide plate 20. A part of the frame 14 is between the liquid crystal panel 16 and the optical member 18 so that the liquid crystal panel 16 and the optical member 18 are away from each other.

A LED (light emitting diode) unit LU, a first reflection sheet 26a, a second reflection sheet 26b, a third reflection sheet 26c, and a light guide plate 20 are arranged in the chassis 22. An opposite surface 20c of the light guide plate 20 has a groove 20d that opens to the rear side. A part (a first contact portion 36a described later) of a heat dissipation member (an example of a holding member) 36 included in the LED unit LU, a LED board 30 and LEDs 28 are arranged in the groove 20d. The LEDs 28 are arranged in the groove 20d such that a light emission surface of each LED 28 faces a light entrance surface 20d1 (see FIG. 5) that is included in one side surface of the groove 20d. The LED 28 emits light toward the light entrance surface 20d1. Light entering the light guide plate 20 through the light entrance surface 20d1 travels through the light guide plate 20 and exits the light guide plate 20 through the light exit surface 20b toward the liquid crystal panel 16. In the backlight unit 24 according to the present embodiment, the light guide plate 20 and the optical member 18 are arranged just below the liquid crystal panel 16 and the LEDs 28 as the light source are arranged in the groove of the light guide plate 20. Thus, the backlight unit 24 has a configuration that is different from a normal edge-light type (a side-light type) backlight unit. However, the LEDs 28 as the light source are arranged to be opposed to a part of the light guide plate 20 and the light traveling through the light guide plate 20 is directed toward the liquid crystal panel 16. Therefore, the backlight unit 24 is an example of the edge-light type (the side-light type) backlight unit.

The chassis 22 is made of metal such as aluminum and includes a bottom plate 22a having a landscape rectangular shape, side plates 22b, 22c extending from an outer edge of each long side of the bottom plate 22a, and side plates extending from an outer edge of each short side of the bottom plate 22a. A space between the side plates 22b, 22c is a housing space where the light guide plate 20 is arranged. A power circuit board (not illustrated) that supplies electric power to the LED unit LU is mounted on a rear side surface of the bottom plate 22a.

The optical member 18 has a landscape rectangular shape in a plan view. The optical member 18 includes a diffuser sheet 18a, a lens sheet 18b, a reflecting type polarizing sheet 18c that are overlaid with each other in this order from a light guide plate 20 side. Light exiting the LED unit LU and travelling through the light guide plate 20 becomes planar light via the diffuser sheet 18a, the lens sheet 18b, the reflecting type polarizing sheet 18c. The liquid crystal panel 16 is arranged on an upper surface side with respect to the reflecting type polarizing sheet 18c to be away from the reflecting type polarizing sheet 18c. As illustrated in FIG. 4, the optical member 18 is arranged such that edges of the optical member 18 with respect to the short-side direction (the Y-axis direction) matches long edge surfaces 20a1, 20a2 of the light guide plate 20.

The light guide plate 20 is a rectangular plate member and made of a resin having high transmissivity (high transparency) such as acrylic. The light guide plate 20 is arranged on the bottom plate 22a of the chassis 22 having the first reflection sheet 26a therebetween to be supported on the bottom plate 22a. As illustrated in FIGS. 2 to 4, the light guide plate 20 is arranged such that long-edge surfaces 20a1, 20a2 are opposed to the long-side plates 22b, 22c (extending in the X-axis direction) of the chassis 22, respectively. The light exit surface 20, which is a main surface, faces the diffuser sheet 18a and the opposite surface 20c, which is a surface opposite to the light exit surface 20b, faces the first reflection sheet 26a. As described before, the light guide plate 20 has the groove 20d on the opposite surface 20c and the LED board 30 and the LEDs 28, which will be described later, are arranged in the groove 20d. The light guide plate 20 has the groove 20d on a portion of the opposite surface 20c close to the one long-side edge surface 20a1. The opposite surface 20c of the light guide plate 20 is divided by the groove 20d into a large surface area and a small surface area. Provided with such a light guide plate 20, light from the LEDs 28 enters the light guide plate 20 through the light entrance surface 20d1 located in the groove 20d and exits the light guide plate 20 through the light exit surface 20b that faces the diffuser sheet 18a. Accordingly, a rear side surface of the liquid crystal panel 16 is illuminated with the light exiting the light guide plate 20.

The first reflection sheet 26a has a rectangular shape and made of a synthetic resin and has a white surface having good reflectivity. The first reflection sheet 26a is in contact with a large surface area out of two surface areas that are defined by the groove 20d in the opposite surface 20c of the light guide plate 20 (a surface area that is between the groove 20d and the other edge surface 20a2 of the light guide plate 20). The first reflection sheet 26a has a reflection surface on its front side. The first reflection sheet 26a reflects light from the LEDs 28 or traveling through the light guide plate 20 and reaching the reflection surface of the first reflection sheet 26a.

Next, configurations of the LEDs 28 and the LED board 30 included in the LED unit LU will be described. Each of the LEDs 28 included in the LED unit LU includes an LED chip (not illustrated) that is arranged on a board fixed on the LED board 30 and sealed with resin. The board is fixed on a surface of the LED board 30 opposed to the light entrance surface 20d1 within the groove 20d. The LED chip mounted on the board has one main light emission wavelength. Specifically, the LED chip that emits light in a single color of blue is used. The resin that seals the LED chip contains phosphors dispersed therein. The phosphors emit light in a predetermined color when excited by blue light emitted from the LED chip. Overall color of light emitted from the LED is white. The phosphors may be selected, as appropriate, from yellow phosphors that emit yellow light, green phosphors that emit green light, and red phosphors that emit red light. The phosphors may be used in combination of the above phosphors or one single phosphor may be used.

The LED board 30 included in the LED unit LU has an elongated plate-like shape extending in the long-side direction (the X-axis direction) of the light guide plate 20. The LED board 30 is arranged in the groove 20d such that plate surface of the LED board 30 is parallel to the X-Z plane, i.e., parallel to the light entrance surface 20d1 of the light guide plate 20. The LED board 30 has a long-side dimension that is substantially equal to a long-side dimension of the light guide plate 20. The LEDs 28 having the above configuration are mounted on a surface of the LED board 30 to be opposed to the light entrance surface. The LEDs 28 are arranged linearly in the longitudinal direction (the X-axis direction) on a mount surface of the LED board 30 at predetermined intervals. The LEDs 28 are arranged at equal intervals in the X-axis direction, that is, each arrangement interval between the LEDs 28 is constant. The direction in which the LEDs 28 arranged matches the long-side direction of the LED board 30 (the X-axis direction). A metal-film trace (not illustrated), such as a copper-foil trace, is formed on the mount surface of each LED board 30. The metal-film trace extends in the X-axis direction and crosses over a group of the LEDs 28 so as to connect the adjacent LEDs 28 in series. Further, a terminal that is mounted at each end of the trace is connected to the power board PWB via connection members such as connectors or wires so that driving power is supplied to each LED 28.

Figure 5:
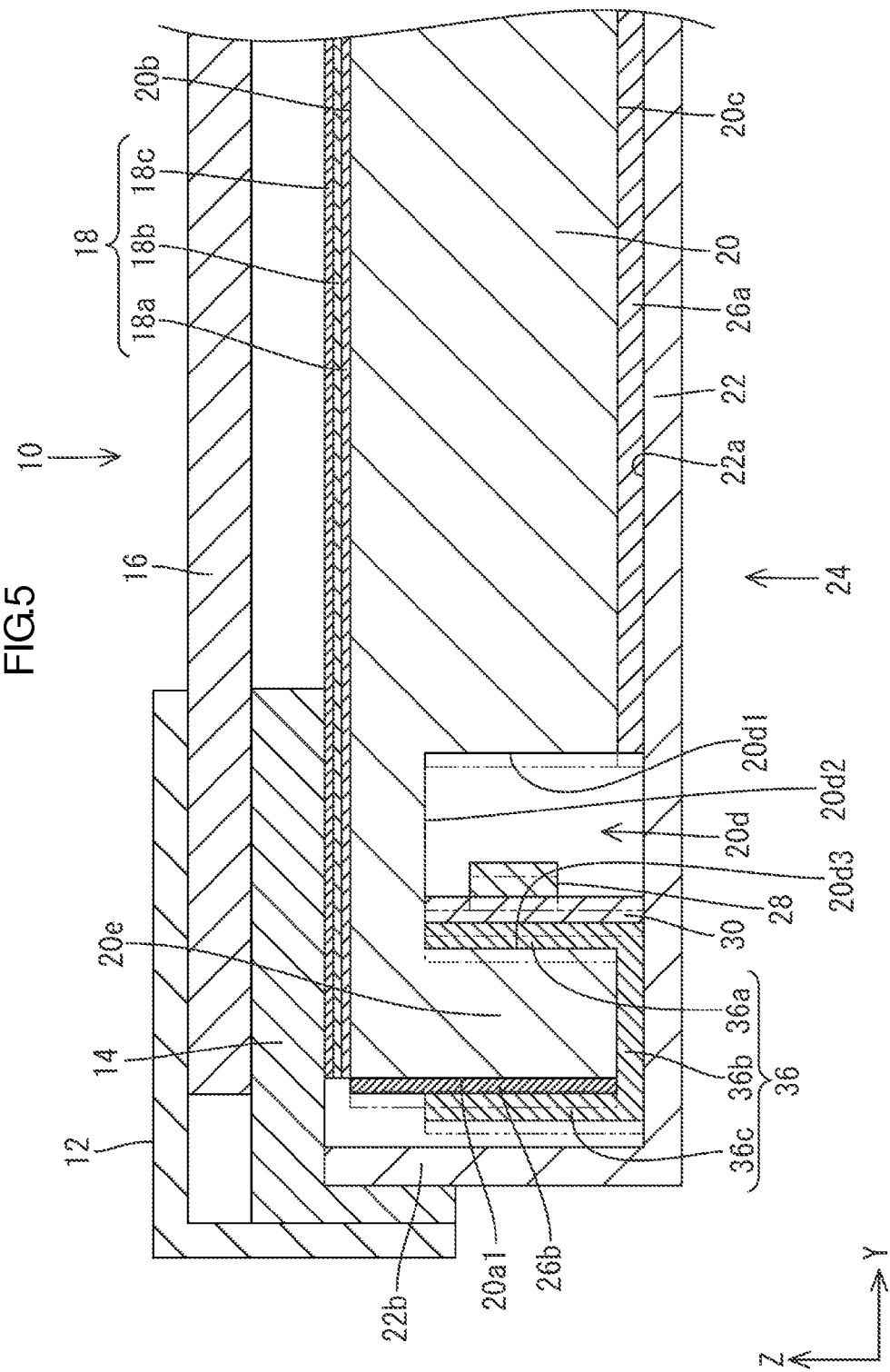
FIG. 5 is a cross-sectional view of a main part of the liquid crystal display device 10.

Next, configurations of the groove 20d included in the light guide plate 20, a heat dissipation member 36 included in the LED unit LU, the second reflection sheet 26b, and the third reflection sheet 26c that are main parts of the present embodiment will be described. The groove 20d is formed in the opposite surface 20c of the light guide plate 20 and opens toward the rear side and extends in the long-side direction (one edge direction) of the light guide plate 20 (the X-axis direction) (refer to FIGS. 3 and 5). As described before, the groove 20d is formed in the opposite surface 20c and close to the one long-edge surface 20a1 of the light guide plate 20. As illustrated in FIG. 5, side surfaces 20d1, 20d3 of the groove 20d are perpendicular to the opposite surface 20c of the light guide plate 20 and a bottom surface (hereinafter, referred to as a groove bottom surface) 20d2 is parallel to the opposite surface 20c of the light guide plate 20. The groove bottom surface 20d2 is located closer to the light exit surface 20b side compared to a middle position of the light guide plate 20 in a thickness direction thereof (the Z-axis direction). Among the side surfaces 20d1, 20d3 of the groove 20d, the side surface 20d1 that is closer to another edge surface 20a2 of the light guide plate 20 is the light entrance surface 20d1 through which light from the LEDs 28 enters the light guide plate 20, as described before. The other side surface 20d3 (a side surface closer to one edge surface of the light guide plate 20) is an opposite side surface 20d3. The groove 20d has two ends in a direction in which the groove 20d extends and the two ends are open at short edge surfaces of the light guide plate 20.

The second reflection sheet 26b and the third reflection sheet 26c are arranged on the long-side edge surfaces of the light guide plate 20 (right and left edge surfaces in FIG. 4), respectively so as to be in contact therewith. The second reflection sheet 26b and the third reflection sheet 26c are arranged to cover the respective edge surfaces with the reflective surfaces facing the light guide plate 20. The second reflection sheet 26b and the third reflection sheet 26c are in contact with entire areas of the long-side edge surfaces of the light guide plate 20. Accordingly, the long-side edge surfaces of the light guide plate 20 have light reflectivity. A part of the rays of light traveling within the light guide plate 20 is directed to the long-side edge surfaces of the light guide plate 20 and the light directed to the long-side surfaces is reflected by the reflection sheets 26b, 26c arranged as described above and returned into the light guide plate 20. Therefore, light is less likely to leak outside the light guide plate 20 through the long-side edge surfaces.

Next, a configuration of the heat dissipation member 36 included in the LED unit LU will be described. The heat dissipation member 36 included in the LED unit LU is a plate member having heat dissipation properties and extends in the long-side direction of the light guide plate 20 (the long-side direction of the chassis 22, the X-axis direction), as illustrated in FIG. 2. The heat dissipation member 36 has a U-shaped cross section in the cross-sectional view of FIG. 5. The heat dissipation member 36 includes a first contact portion 36a, a second contact portion 36c, and a connecting portion 36b. The first contact portion 36a included in the heat dissipation member 36 is vertical to the opposite surface 20c of the light guide plate 20 and one surface of the first contact portion 36a is in contact with the opposite side surface 20d3 of the groove 20d formed in the light guide plate 20. The first contact portion 36a has a long side that is parallel to the long-side direction of the light guide plate 20 (the X-axis direction) and has a short side that is parallel to a thickness direction of the light guide plate 20 (the Z-axis direction). The first contact portion 36a has another surface (that is a surface opposite to the surface contacting the opposite side surface 20d3) where the LED board 30 is mounted. The surface of the LED board 30 opposite to the mount surface is mounted on the other surface of the first contact portion 36a. Therefore, the surface of the LED board 30 is parallel to the light entrance surface 20d1 included in the groove 20d and light emitted from the LEDs 28 arranged on the mount surface of the LED board 30 is optimally incident on the light entrance surface 20d1 included in the groove 20d. A length of the long side (along the X-axis direction) of the first contact portion 36a is substantially equal to a length of the long side of the light guide plate 20. A length of the short side (along the Z-axis direction) of the first contact portion 36a is substantially equal to a length of the short side of the opposite side surface 20d3 of the groove 20d. A distal end of the first contact portion 36a with respect to the short-side direction (the Z-axis direction) is in contact with the groove bottom surface 20d2 (refer to FIG. 5).

The second contact portion 36c included in the heat dissipation member 36 is vertical to the opposite surface 20c of the light guide plate 20 and one surface of the second contact portion 36c is in contact with the second reflection sheet 26b with a surface opposite to the surface contacting the one edge surface 20a1 of the light guide plate 20. Namely, the second reflection sheet 26b is held between the one edge surface 20a1 of the light guide plate 20 and the second contact portion 26c of the heat dissipation member 36. Accordingly, the second reflection sheet 26b is less likely to be removed from the one edge surface 20a1 of the light guide plate 20. The second contact portion 36c, similarly to the first contact portion 36a, has a long side that is parallel to the long side (along the X-axis direction) of the light guide plate 20 and has a short side that is parallel to a thickness direction (along the Z-axis direction) of the light guide plate 20. The second contact portion 36c, similarly to the first contact portion 36a, has the long side (along the X-axis direction) substantially equal in length to the long side of the light guide plate 20. The second contact portion 36c has a short side (along the Z-axis direction) substantially equal in length to the short side of the opposite surface 20d3 of the groove 20d. As described before, the first contact portion 36a arranged in the groove 20d of the light guide plate 20 and the second contact portion 36c arranged on the one edge surface 20a1 of the light guide plate 20 hold a part of the light guide plate 20 therebetween (the portion of the light guide plate 20 held by the first contact portion 36a and the second contact portion 36c is referred to as a held portion 20e).

The connecting portion 36b included in the heat dissipation member 36 connects the first contact portion 36a and the second contact portion 36c and is parallel to the bottom plate 22a of the chassis 22. The connecting portion 36b has a front-side surface being in contact with the bottom surface 22a of the held portion 20e of the light guide plate 20a and a rear-side surface being in contact with the bottom plate 22a of the chassis 22. The connecting portion 36b is sandwiched between the light guide plate 20 and the chassis 22. The heat dissipation member 36 includes the first contact portion 36a and the second contact portion 36c projecting from the connecting portion 36b. Accordingly, the connecting portion 36b has a facing surface that is open. The heat dissipation member 36 is easily mounted on the light guide plate 20 by moving the heat dissipation member 36 closer to the light guide plate 20 from the rear side (an opposite surface side) of the light guide plate 20 so that the held portion 20e of the light guide plate 20 is arranged between the first contact portion 36a and the second contact portion 36c. Then, the heat dissipation member 36 is fixed to the light guide plate 20 with screws or an adhesive tape so that the heat dissipation member 36 is attached to the light guide plate 20. A short-side dimension (in the Y-axis direction) of the connecting portion 36b is approximately equal to a total of thickness of the held portion 20e of the light guide plate 20 in the Y-axis direction and thickness of the second reflection sheet 26b. Therefore, no space is between the heat dissipation member 36 and the light guide plate 20 and the heat dissipation member 36 that is attached to the light guide plate 20 is less likely to be detached therefrom.

Double-dotted chain lines in FIG. 5 illustrate positions of the light entrance surface 20d1 and the opposite side surface 20d3 included in the groove and the heat dissipation member 36 when the light guide plate 20 thermally expands. As described before, the heat dissipation member 36 mounted on the light guide plate 20 is retained by the light guide plate 20. Therefore, if the light guide plate 20 thermally expands, the heat dissipation member 36 moves according to the movement of the light entrance surface 20d1 and the opposite side surface 20d3 of the groove 20d of the light guide plate 20. The heat dissipation member 36 moves by a distance same as the light entrance surface 20d1 and the opposite side surface 20d3 move. Thus, the distance between the LEDs 28 and the light entrance surface 20d1 does not change before and after the thermal expansion of the light guide plate 20. If the light guide plate 20 thermally shrinks from the thermally expanded state, the light entrance surface 20d1 and the opposite side surface 20d3 included in the groove and the heat dissipation member 36 returned to the respective original positions illustrated by solid lines.

Similarly to the thermal expansion, the heat dissipation member 36 moves by the distance same as the light entrance surface 20d1 and the opposite side surface 20d3 of the groove 20d of the light guide plate 20 move. Therefore, the distance between the LEDs 28 and the light entrance surface 20d1 does not change before and after the thermal shrinkage of the light guide plate 20. The LED unit LU is not supported by the chassis 22 but by the light guide plate 20, and therefore, the distance between the LEDs 28 and the light entrance surface 20d1 is not affected by the variations in size precision of the chassis 22 even if variations occur in size precision of each part of the chassis 22. Therefore, the distance between the LEDs 28 and the light entrance surface 20d1 is maintained constant even with occurrence of the variations in size precision of the chassis 22. According to the backlight unit 24, the distance between the LEDs 28 and the light entrance surface 20d1 is maintained constant regardless of occurrence of the variations in size precision of the chassis 22, and the light entrance efficiency of light emitted from the LED 28 and being incident on the light entrance surface 20d1 is maintained constant.

In the backlight unit 24 according to the present embodiment, as described before, the heat dissipation member 36 holds the held portion 20e of the light guide plate 20 and the heat dissipation member 36 and the LED board 30 are attached to the light guide plate 20. Accordingly, the light guide plate 20 and the LEDs 28 mounted on the LED board are provided as an integral unit. In such a state, the LEDs 28 arranged on the opposite side surface 20d3 side in the groove 20d are opposed to the light entrance surface 20d1 that is opposite to the opposite side surface 20d3. Therefore, light emitted from the LEDs 28 is directed toward the light entrance surface 20d1. The heat dissipation member 36 that is attached to the light guide plate 20 moves according to the thermal expansion or the thermal shrinkage of the light guide plate 20. Therefore, the distance between the LEDs 28 and the light entrance surface 20d1 does not change before and after the thermal expansion or the thermal shrinkage even if the light guide plate 20 thermally expands or shrinks. Further, the LEDs 28 and the LED board 30 are not attached to the chassis 22 but to the light guide plate 20. Therefore, the distance between the LEDs 28 and the light entrance surface 20d1 is less likely to be affected by the variations in size precision of the chassis 22 and the distance between the LEDs 28 and the light entrance surface 20d1 is maintained constant. As a result, the light entrance efficiency of light emitted from the LED 28 and being incident on the light entrance surface 20d1 is maintained constant and the optical properties of the backlight unit 24 are improved. As described before, the backlight unit 24 according to the present embodiment is less likely to be affected by thermal expansion or thermal shrinkage of the light guide plate 20 or the variations in size precision of the chassis 22, and good optical properties are maintained.

In the backlight unit 24 according to the present embodiment, the LEDs 28 and the light guide plate 20 are provided as an integral unit by attaching the heat dissipation member 36 to the light guide plate 20. Therefore, the distance between the LEDs 28 and the light entrance surface 20d1 is maintained constant without using a component such as a spacer. Accordingly, light emitted from the LED 28 and directed toward the light entrance surface 20d1 is not blocked by any other components.

The backlight unit 24 according to the present embodiment includes the first reflection sheet 26a that is in contact with the opposite surface 20c. The second reflection sheet is arranged to be in contact with the one long-side edge surface of the light guide plate 20 and this provides light reflectivity to the one edge surface 20a1. Further, the third reflection sheet 26c is arranged to be in contact with the other long-side edge surface 20a2 of the light guide plate 20 (another edge surface opposite the one edge surface 20a1) and this provides light reflectivity to the other edge surface 20a2. According to such a configuration, light traveling toward the opposite surface 20c is reflected by the first reflection sheet 26 toward the light entrance surface 20d1. Further, light traveling toward the long-side edge surfaces 20a1, 20a2 is reflected by the second reflection sheet 26a2 or the third reflection sheet 26a3 and directed toward the light entrance surface 20d1. As a result, brightness of the backlight unit 24 is improved.

First Modification of the First Embodiment

Figure 6:
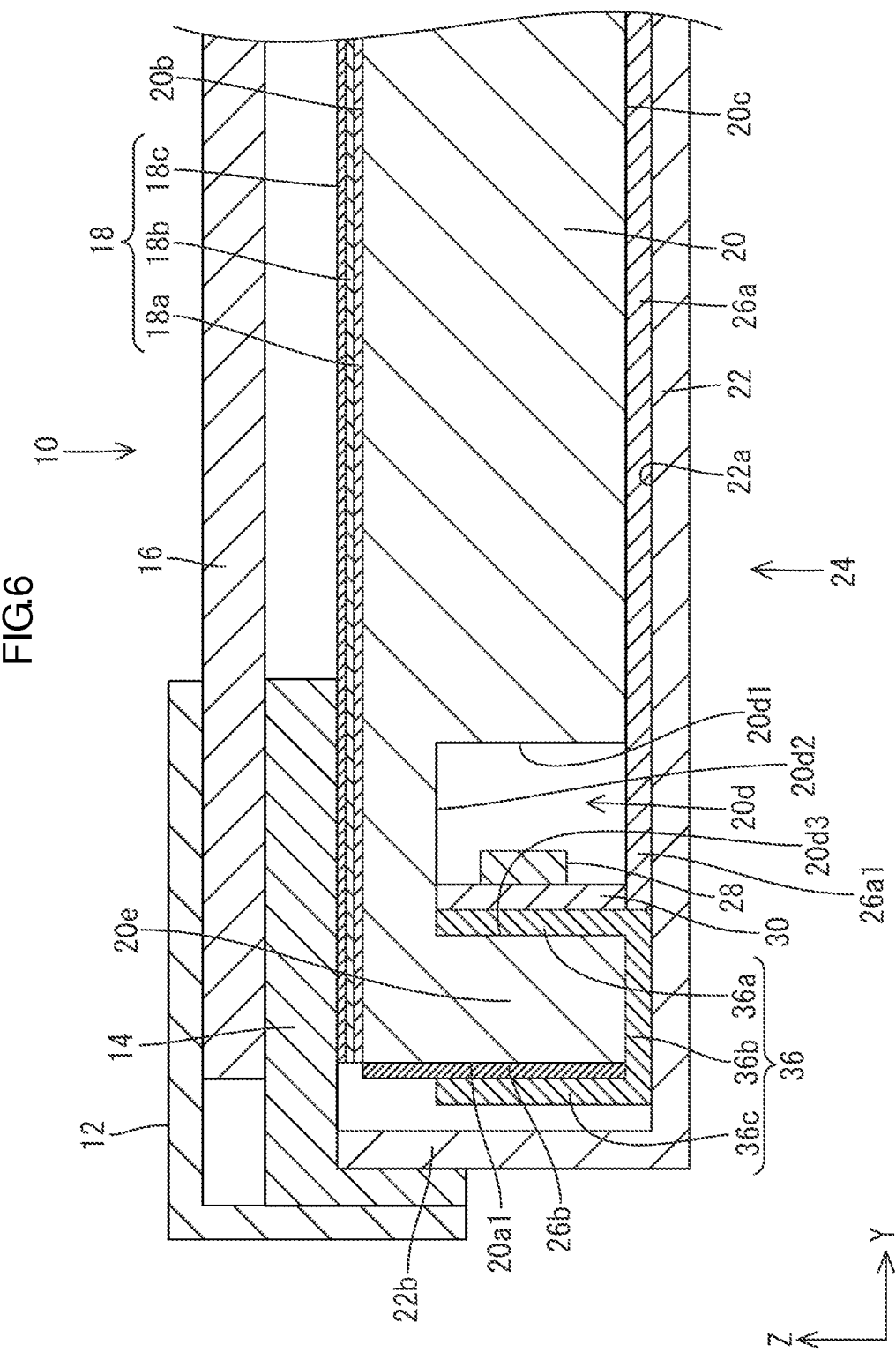
FIG. 6 is cross-sectional view of a main part of the liquid crystal display device 10 according to a first modification.

A first modification of the first embodiment will be described. According to the first modification illustrated in FIG. 6, a first reflection sheet 26a has a configuration different from that in the first embodiment. Other configurations are same as those in the first embodiment and therefore, the constructions, functions, and effects similar to those of the first embodiment will not be described. According to the first modification of the first embodiment, as illustrated in FIG. 6, the first reflection sheet 26a extends to the heat dissipation member 36 side and a groove-side end of the first reflection sheet 26a reaches the heat dissipation member 36 (hereinafter, an extended portion is referred to as an extended portion 26a1). The end of the first reflection sheet 26a is in contact with a rear-side end of the first contact portion 36a of the heat dissipation member 36. Accordingly, an opening of the groove 20d is covered by the extended portion 26a1. According to such a configuration, by extending the first reflection sheet 26a, light emitted from the LEDs 28 and directed toward the opening of the groove 20d is reflected by the extended portion 26a1 of the first reflection sheet 26a toward the light entrance surface 20d1 of the light guide plate 20 without using other components such as other reflection sheets. Accordingly, light entrance efficiency of light emitted from the LEDs 28 and being incident on the light entrance surface 20d1 is improved.

Second Modification of the First Embodiment

Figure 7:
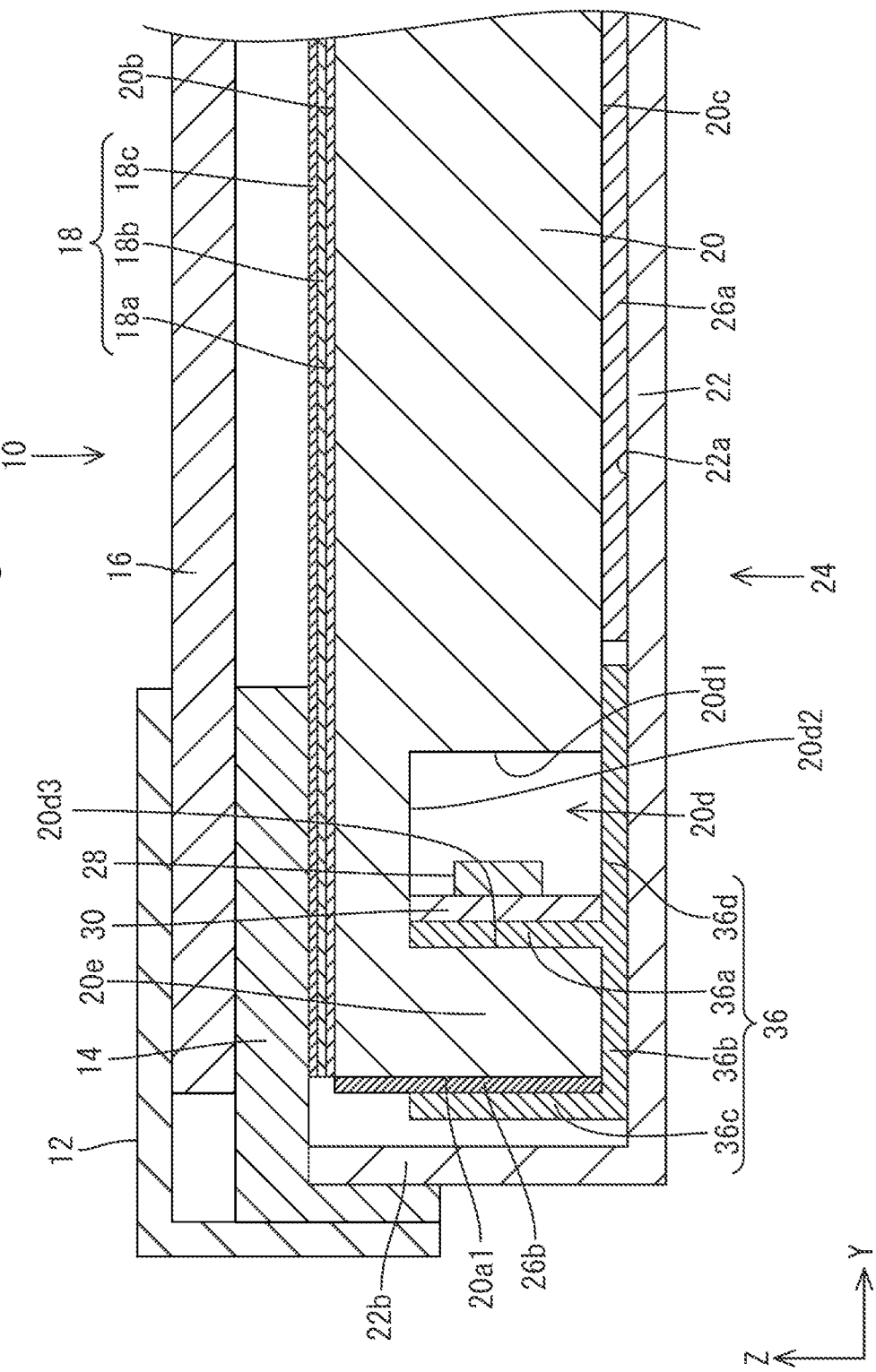
FIG. 7 is cross-sectional view of a main part of the liquid crystal display device 10 according to a second modification.
Figure 8:
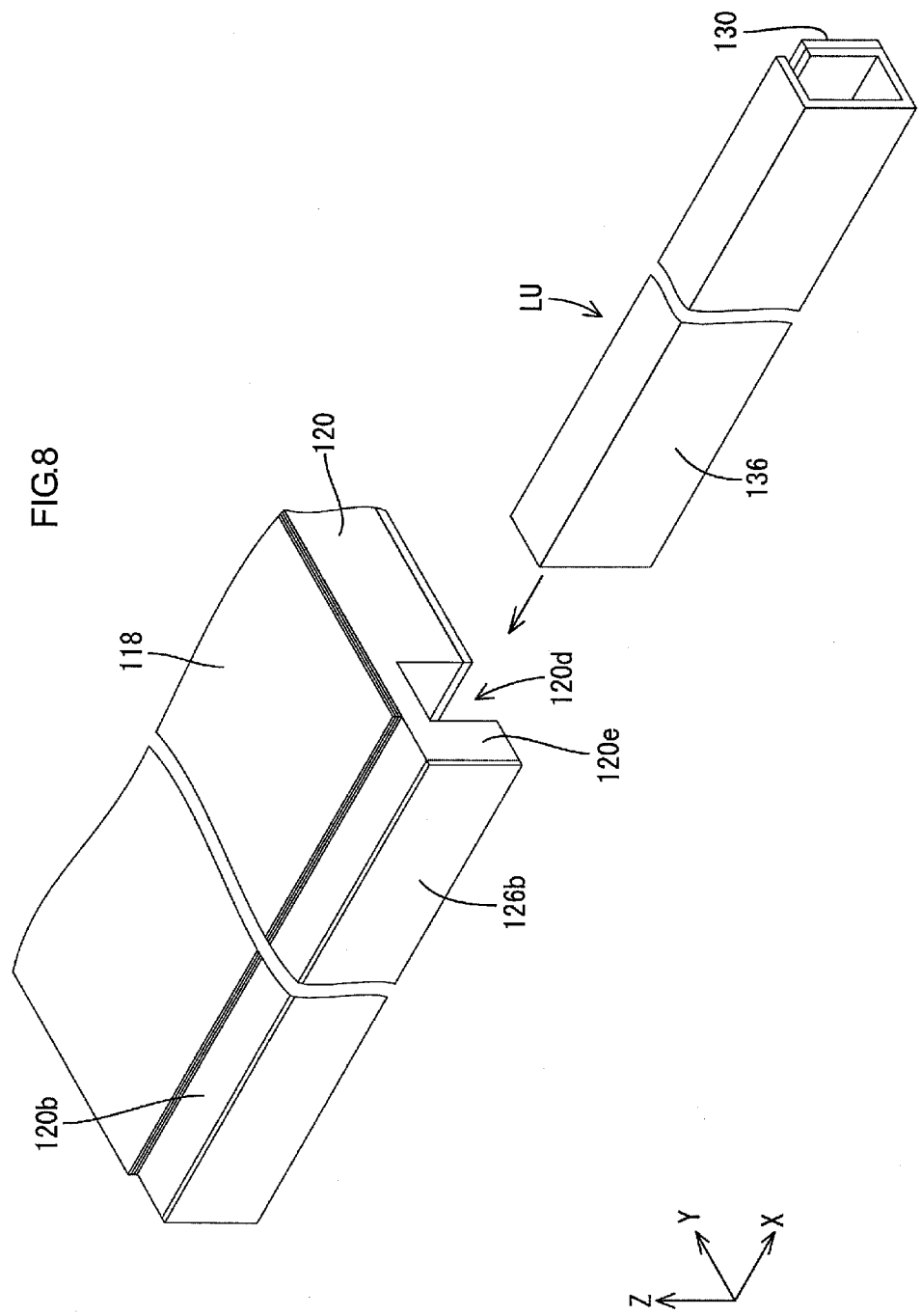
FIG. 8 is a perspective view of a main part of a LED unit LU before being mounted to a light guide plate 120 included in a liquid crystal display device 110 according to a second embodiment.

A second modification of the first embodiment will be described. According to the second modification illustrated in FIG. 7, a configuration of a heat dissipation member 36 differs from that in the first embodiment. Other configurations are same as those in the first embodiment and therefore, the constructions, functions, and effects similar to those of the first embodiment will not be described. According to the second modification of the first embodiment, as illustrated in FIG. 7, a plate-like cover portion 36d extends from a connection portion between the first contact portion 36a and the connecting portion 36b of the heat dissipation member 36 toward the first reflection sheet 26a. The cover portion 36d is molded integrally with the heat dissipation member 36 to be formed as a part of the heat dissipation member 36. The cover portion 36d extends so that an extended end thereof is in contact with the opposite surface 20c adjacent to the light entrance surface 20d1. As a result, the opening of the groove 20d is covered by the cover portion 36d. According to such a configuration, light emitted from the LEDs 28 and directed toward the opening of the groove 20d reaches the cover portion 36d and the light directed toward the opening is less likely to leak outside the light guide plate 20 by the cover portion 36d.

Second Embodiment

Figure 10:
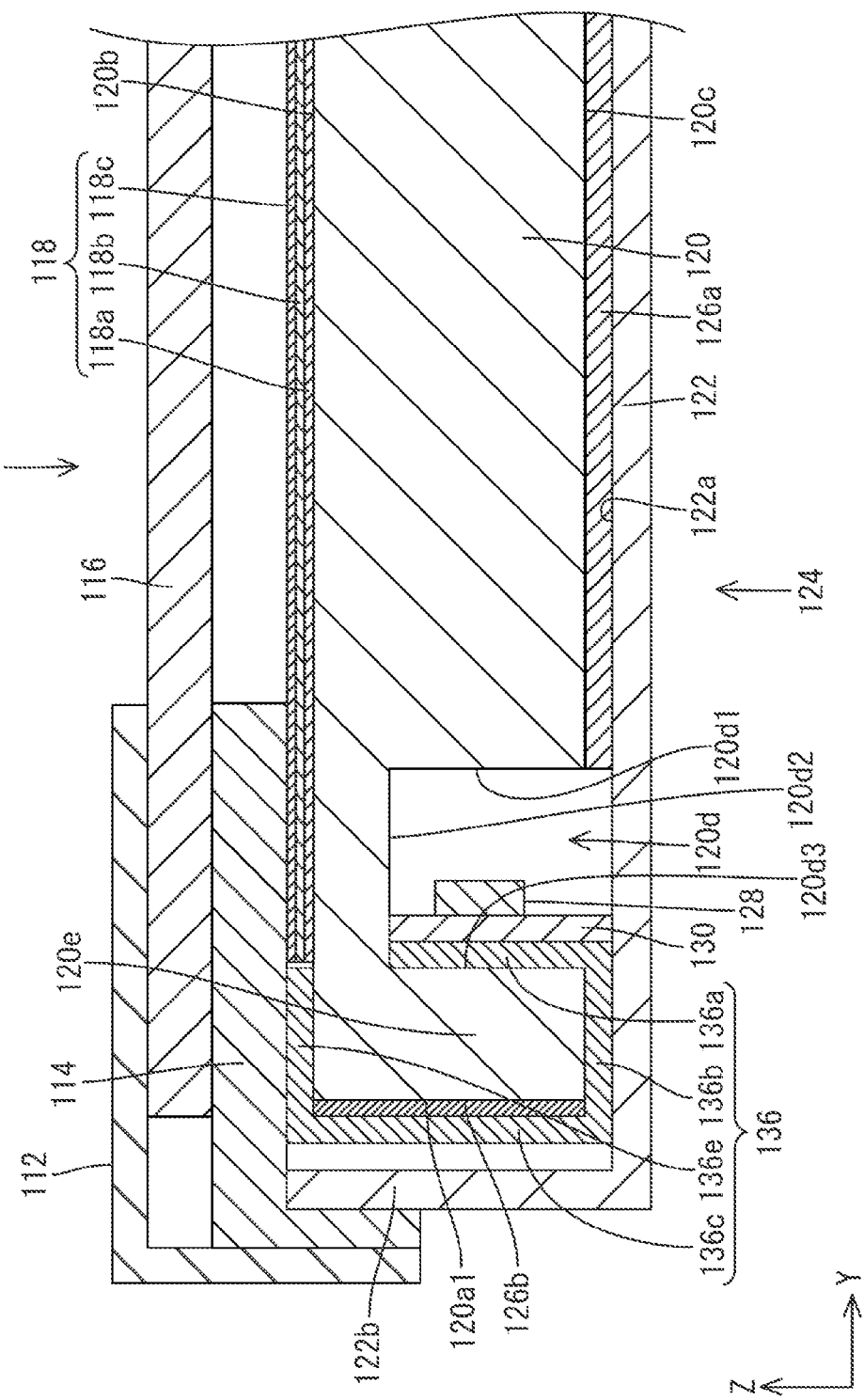
FIG. 10 is a cross-sectional view of a main part of the liquid crystal display device 110.

A second embodiment will be described with reference to drawings. According to the second embodiment, a configuration of a heat dissipation member 136 differs from that in the first embodiment. Other configurations are same as those in the first embodiment and therefore, the constructions, functions, and effects similar to those of the first embodiment will not be described. In FIG. 10, components represented by numerals which one hundred is added to the numerals in the first embodiment are same as those in the first embodiment.

In a backlight unit 124 according to the second embodiment, as illustrated in FIG. 10, a third contact portion 136e extends from an end of a second contact portion 136c opposite to a connecting portion 136b side end (from a front-side end). The third contact portion 136e is in contact with one edge surface 120a1 and a part of a light exit surface 120b of the light guide plate 120. The third contact portion 136e is molded integrally with the heat dissipation member 136 to form a part of the heat dissipation member 136. According to such a configuration, a held portion 120e of the light guide plate 120 is sandwiched by the connecting portion 136b and the third contact portion 136e of the heat dissipation member 136 with respect to a thickness direction (the Z-axis direction) of the light guide plate 120. Therefore, compared to the configuration of the first embodiment, the heat dissipation member 136 is less likely to be detached from the light guide plate 120. The third contact portion 136e extends so that an end thereof is close to one edge portion of an optical member 118. A front-side surface of the held portion 120e of the light guide plate 120 (a part of the light exit surface 120b) is covered by the third contact portion 136e. Therefore, light directed toward the front-side surface of the held portion 120e of the light guide plate 120 is less likely to leak outside the light guide plate 120.

In the backlight unit 124 according to the second embodiment, a groove 120d is open at two ends thereof in a direction in which the groove 120d extends (the X-axis direction) and the heat dissipation member 136 is open at two ends thereof in a direction in which the heat dissipation member 136 extends (the X-axis direction). The heat dissipation member 136 is moved along the long-side direction (the X-axis direction) of the light guide plate 120 from the short-side edge surface of the light guide plate 120 so that the held portion 120e of the light guide plate 120 is arranged between the first contact portion 136a and the second contact portion 136c. Accordingly, the heat dissipation member 136 is easily mounted to the light guide plate 120. When detaching the heat dissipation member 136 from the light guide plate 120, the heat dissipation member 36 is easily detached from the light guide plate 20 by sliding the heat dissipation member similarly to the mounting operation. As described before, the heat dissipation member 136 is further less likely to be detached from the light guide plate 120 compared to the configuration of the first embodiment. Therefore, the heat dissipation member 136 is attached to the light guide plate 120 without fixing the heat dissipating member 136 that is mounted on the light guide plate 120 with using another fixing member such as screws or adhesive tapes.

Third Embodiment

Figure 9:
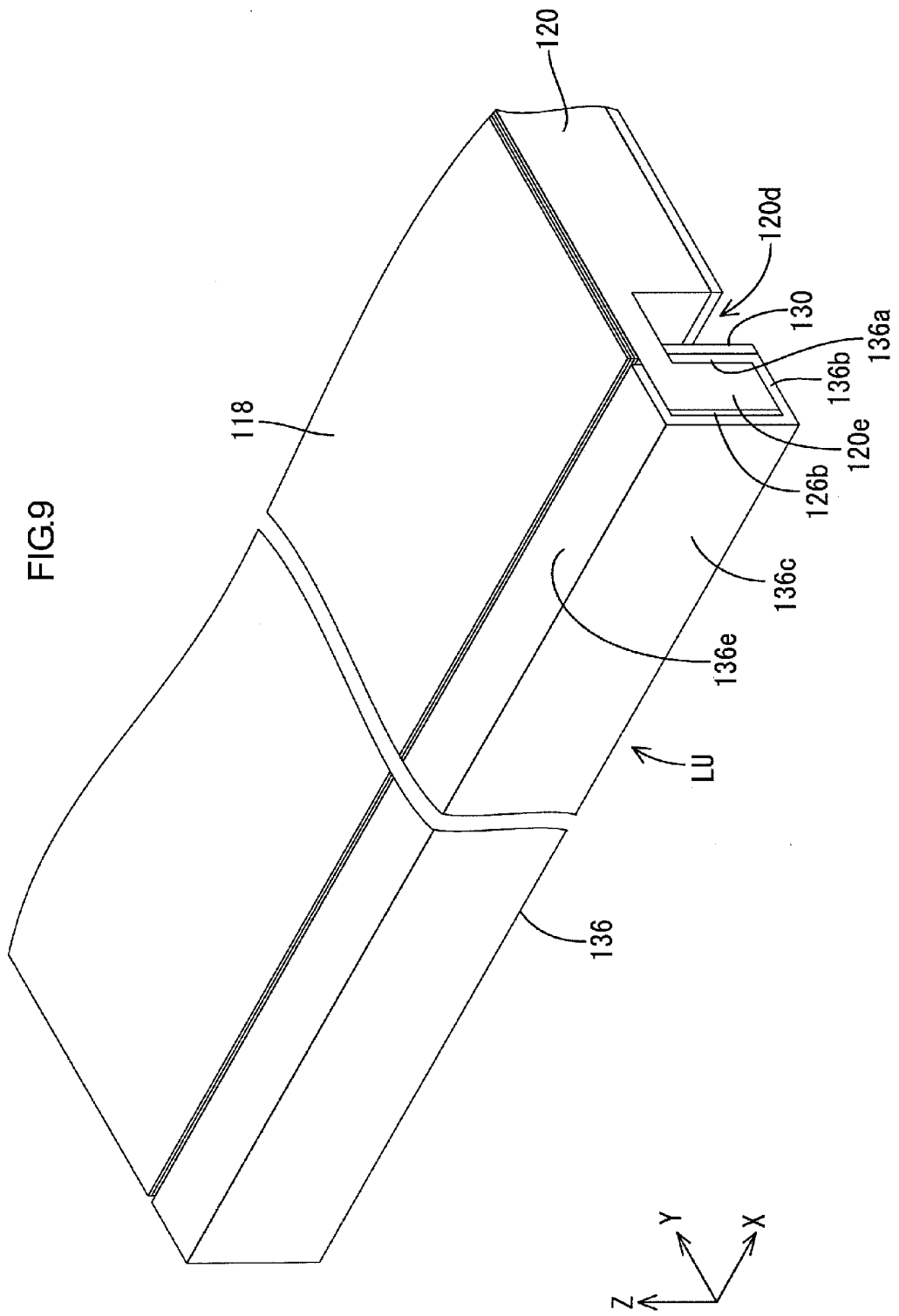
FIG. 9 is a perspective view of a main part of a LED unit LU after being mounted to the light guide plate 120 included in the liquid crystal display device 110 according to the second embodiment.
Figure 11:
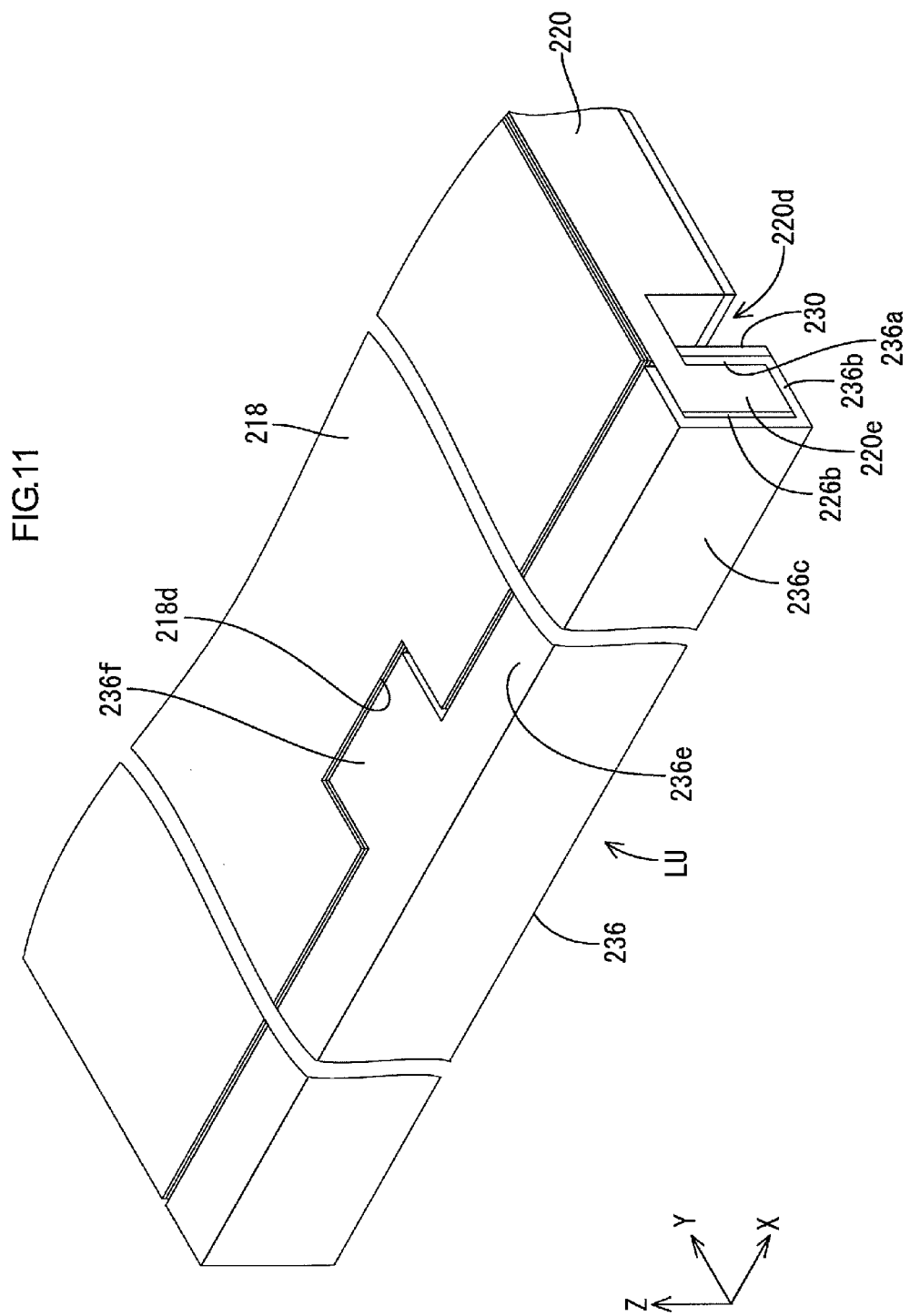
FIG. 11 is a perspective view of a main part of a LED unit LU after being mounted to a light guide plate 220 included in a liquid crystal display device 210 according to a third embodiment.
Figure 12:
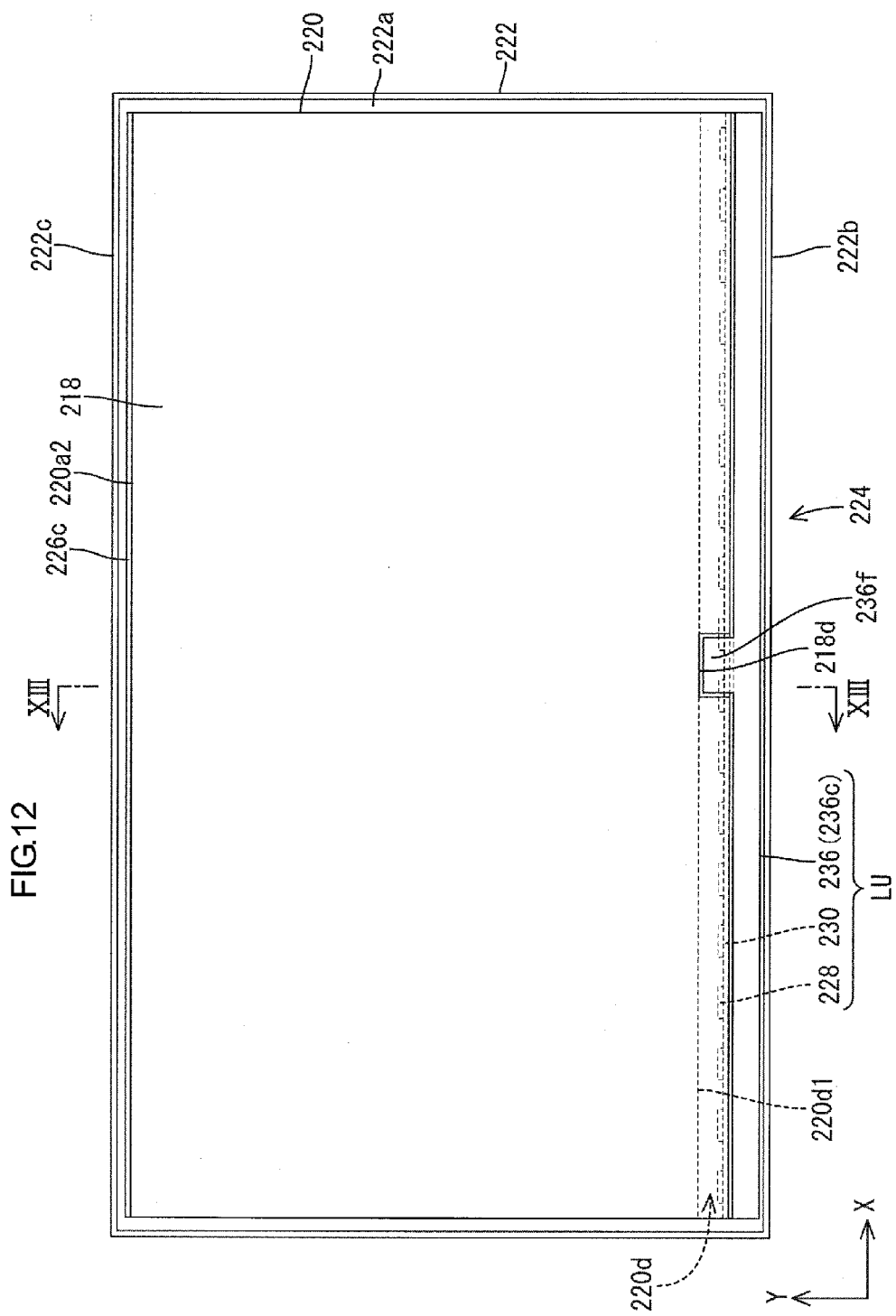
FIG. 12 is a plan view of a backlight unit 224.
Figure 13:
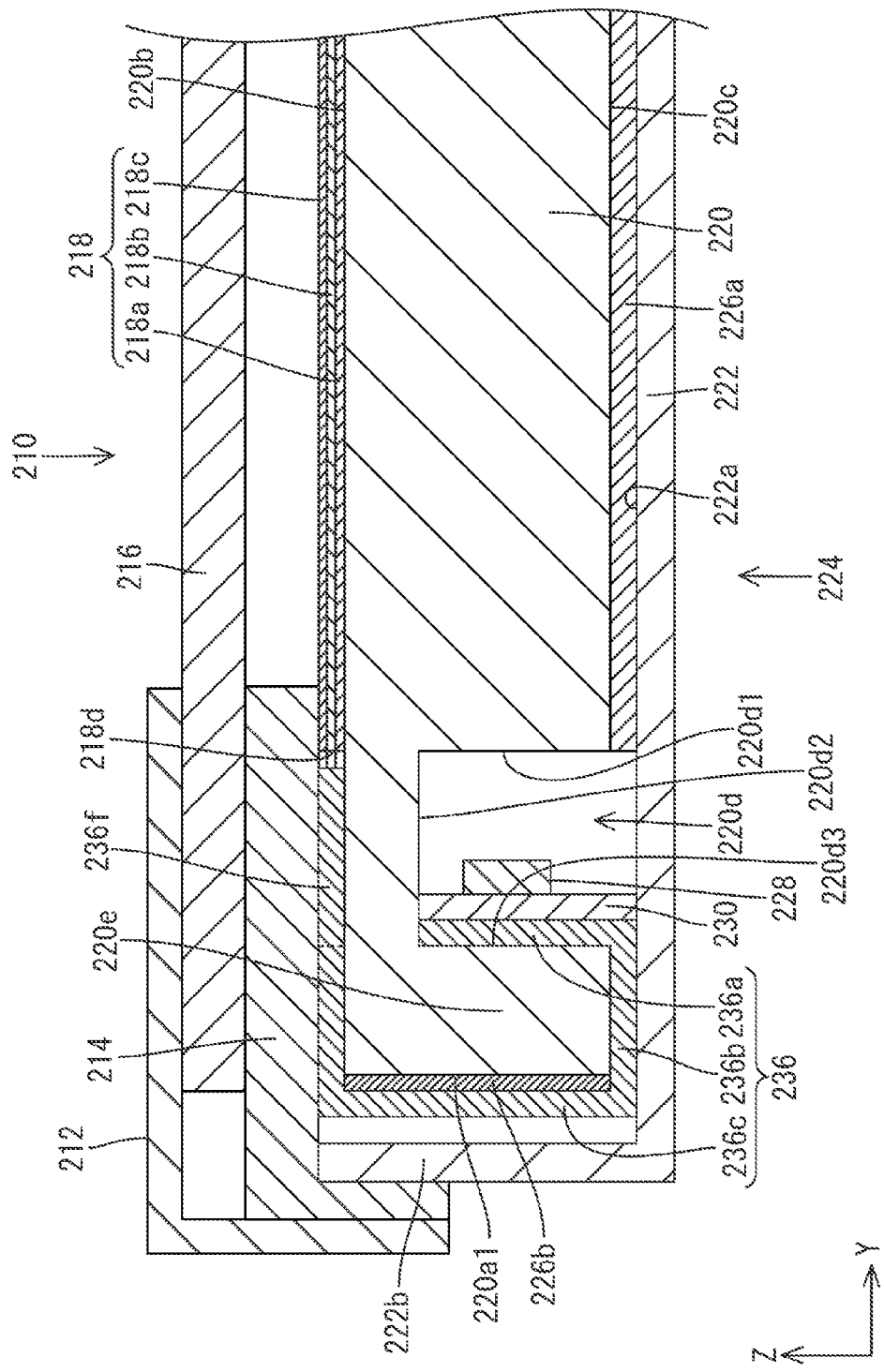
FIG. 13 is a cross-sectional view of a main part of the liquid crystal display device 210.

A third embodiment will be described with reference to drawings. According to the third embodiment, a configuration of a heat dissipation member 236 differs from that in the second embodiment. Other configurations are same as those in the first embodiment and the second embodiment and therefore, the constructions, functions, and effects similar to those of the first and second embodiments will not be described. In FIGS. 12 and 13, components represented by numerals which two hundreds is added to the numerals in FIGS. 3 and 5 are same as those in FIGS. 3 and 5 according to the first and second embodiments. In FIG. 11, components represented by numerals which one hundred is added to the numerals in FIG. 9 are same as those in FIG. 9 according to the first and second embodiments.

In a backlight unit 224 according to the third embodiment, as illustrated in FIGS. 11 to 13, the heat dissipation member 236 includes an extended portion 236f further to the configuration of the second embodiment. The extended portion 236f extends from an end of a third contact portion 236e opposite to a second contact portion 236c side toward a middle portion of a light exit surface 220b. Specifically, the extended portion 236f has a plan view rectangular plate-like shape that extends from a substantially middle portion of an edge of the third contact portion 236e with respect to the X-axis direction (see FIG. 12). As illustrated in FIG. 12, an optical member 218 has a recess 218d on an edge thereof corresponding to the extended portion 236f. The recess 218d has a shape and a size such that the extended portion 236f is fitted thereto. The extended portion 236f is fitted to the recess 218d formed in the optical member 228. According to the configuration in which the extended portion 236f is fitted to the recess 218d of the optical member 218, the optical member 218 is stopped by the extended portion 236f. Accordingly, the optical member 218 is less likely to move in a plate surface direction of the light guide plate 220 (along a X-Y plane).

Fourth Embodiment

Figure 15:
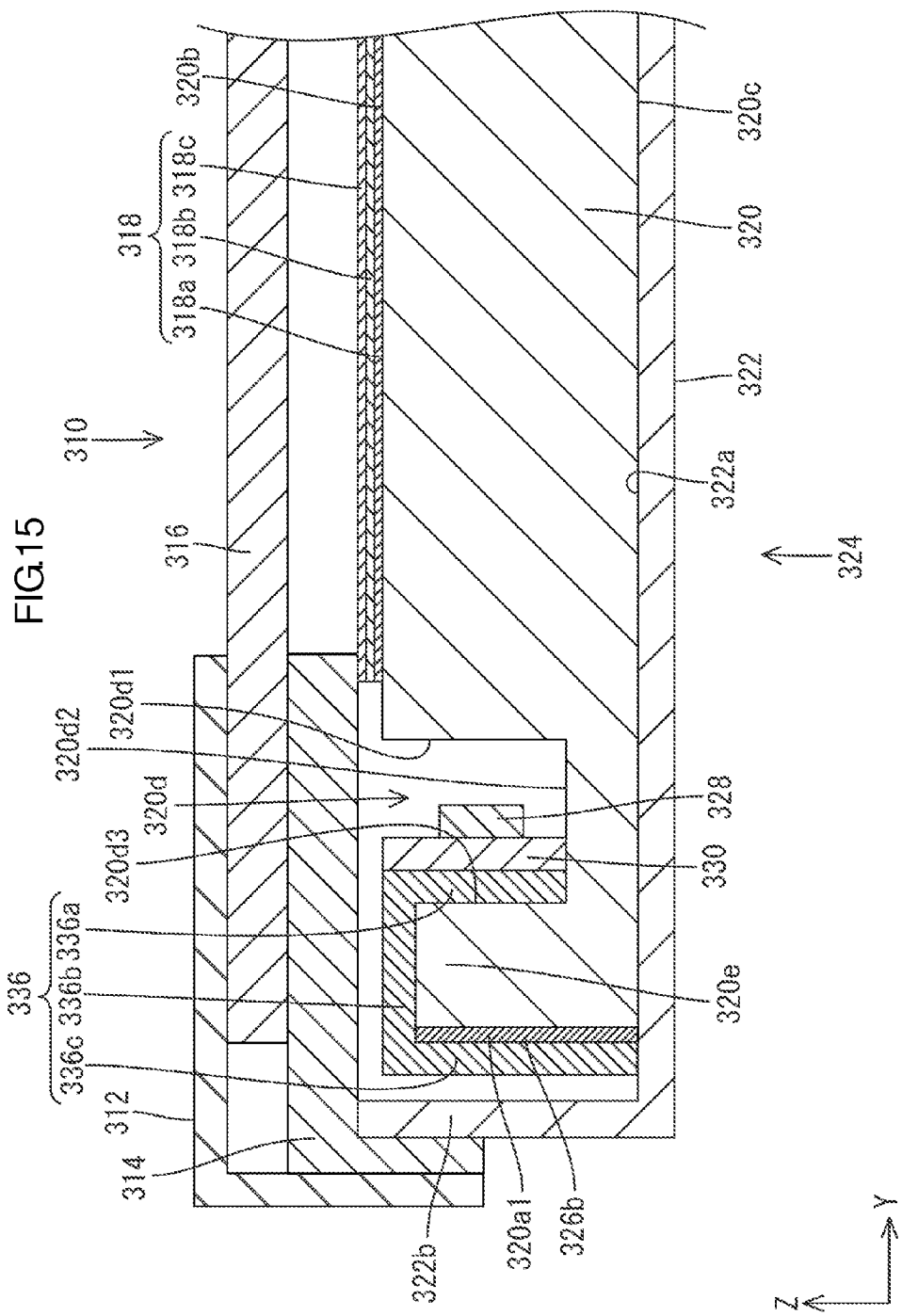
FIG. 15 is a cross-sectional view of a main part of the liquid crystal display device 310.

A fourth embodiment will be described with reference to drawings. According to the fourth embodiment, an arrangement of a groove differs from that in the first embodiment. Other configurations are same as those in the first embodiment and therefore, the constructions, functions, and effects similar to those of the first embodiment will not be described. In FIG. 15, components represented by numerals which three hundreds is added to the numerals in the first embodiment are same as those in the first embodiment.

Figure 14:
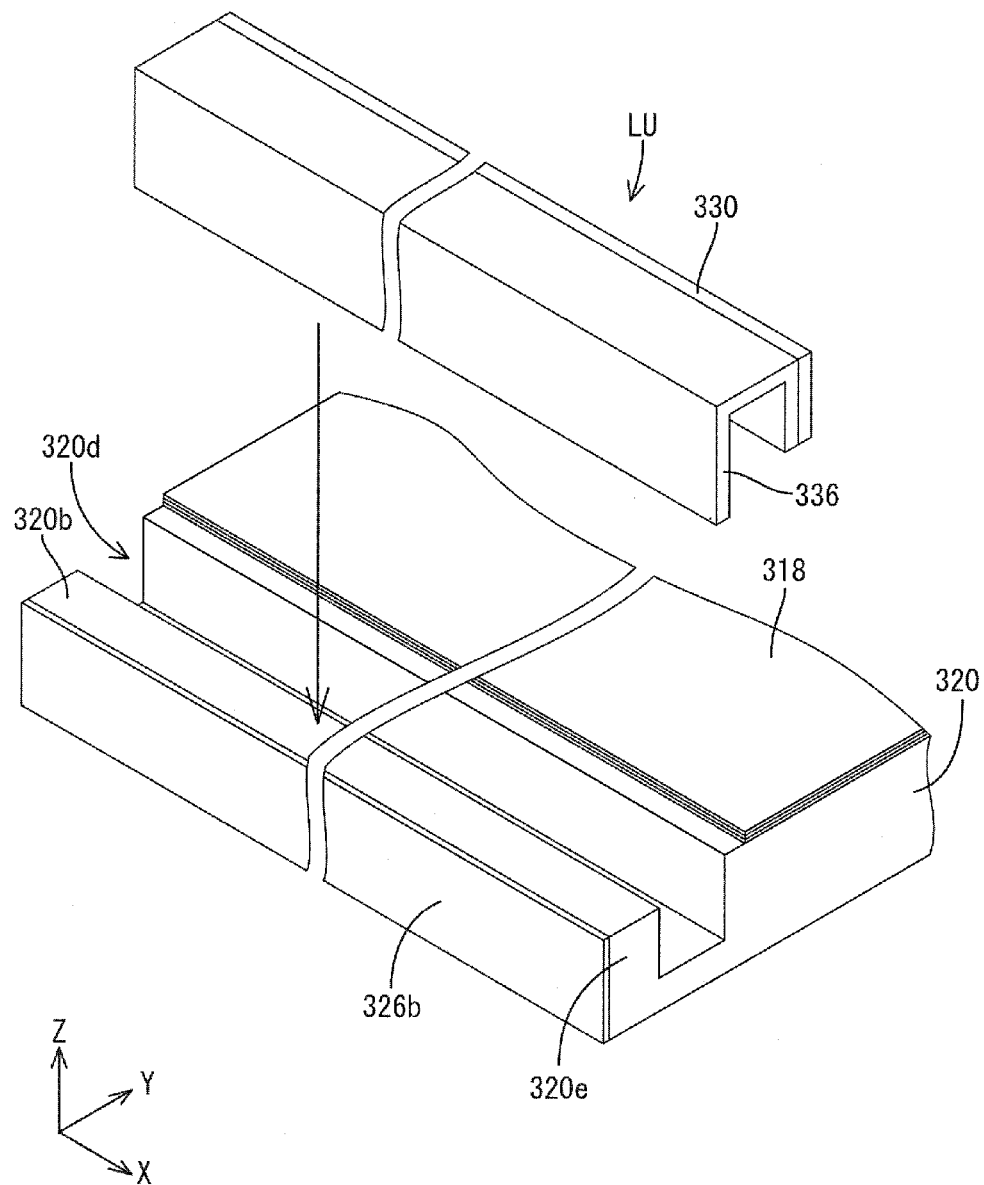
FIG. 14 is a perspective view of a main part of a LED unit LU before being mounted to a light guide plate 320 included in a liquid crystal display device 310 according to a fourth embodiment.

In a backlight unit 324 according to the fourth embodiment, as illustrated in FIGS. 14 and 15, a light guide plate 320 includes a groove 320d in a light exit surface 320b and the groove 320d is open toward a front surface side. The groove 320d has a shape and a configuration same as those in the first embodiment. The heat dissipation member has a shape and a configuration same as those in the first embodiment. The first contact portion is in contact with an opposite side surface of the groove 320d formed in the light exit surface 320b and the connecting portion is arranged on the light exit surface side. The shapes of the light guide plate 320 and the heat dissipation member 336 according to the fourth embodiment are same as upside-down shapes of the light guide plate 20 and the heat dissipation member 36 according to the first embodiment. According to such a configuration, the distance between LEDs 328 and a light entrance surface 320d1 is kept constant even with occurrence of thermal expansion or thermal shrinkage of the light guide plate 320 or the variations in size precision of a chassis 322. Therefore, light entrance efficiency of light emitted from the LEDs 328 and being incident on the light entrance surface 320d1 is maintained constant and good optical properties are maintained. The heat dissipation member 336 is attached to the light guide plate 320 from a front-surface side of the chassis 322 (a light exit surface 320b side of the light guide plate 320) during a manufacturing process of the backlight unit 324 since the groove 320d is formed in the light exit surface 320b (see FIG. 14). Therefore, the heat dissipation member 336 is mounted on the light guide plate 320 after the light guide plate 320 is arranged in the chassis 322.

First Modification of Fourth Embodiment

Figure 16:
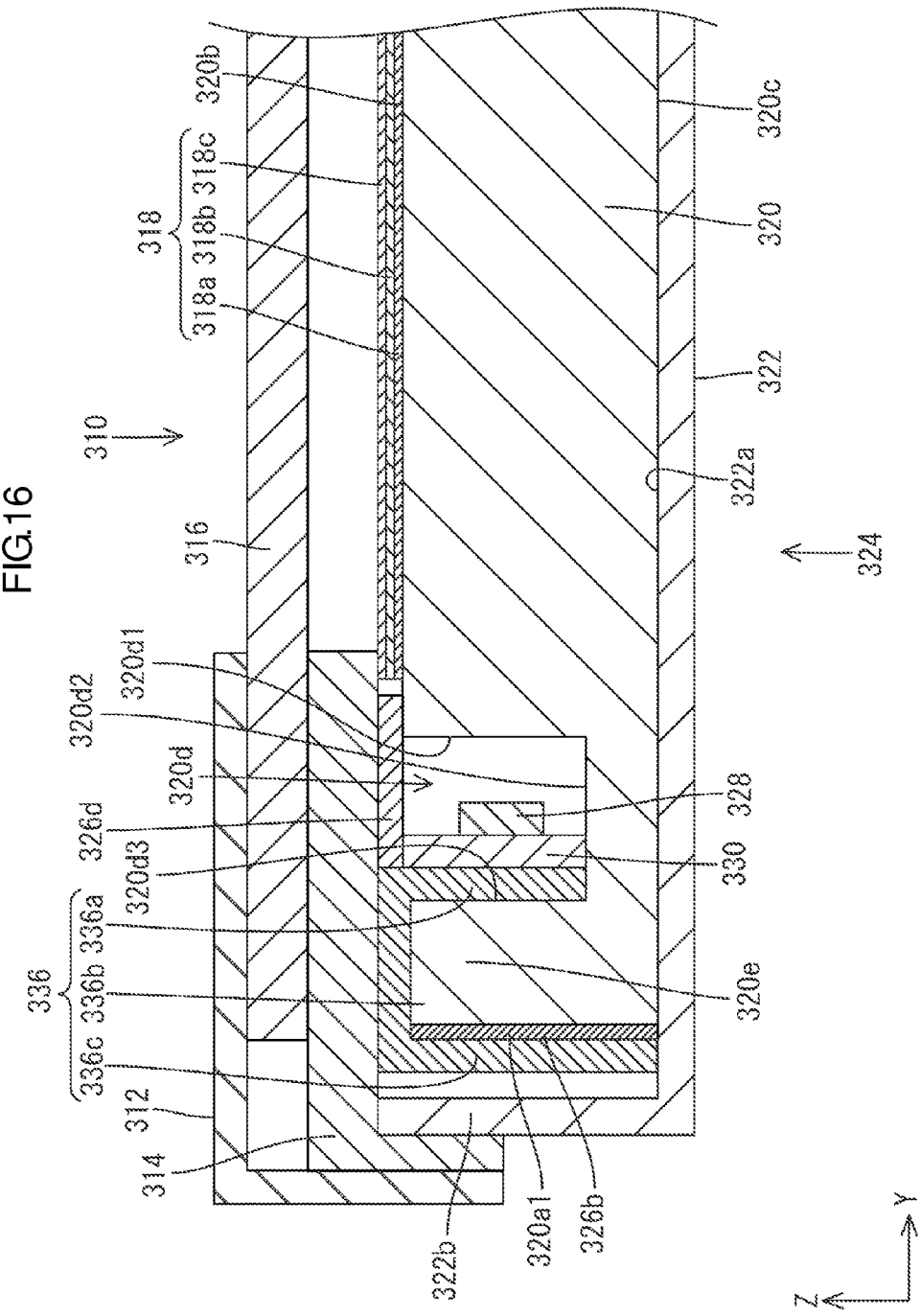
FIG. 16 is a cross-sectional view of a main part of the liquid crystal display device 310 according to a first modification of the fourth embodiment.

A first modification of the first embodiment will be described. The first modification illustrated in FIG. 16 differs from the fourth embodiment in including another fourth reflection sheet 326d. Other configurations are same as those in the fourth embodiment and therefore, the constructions, functions, and effects similar to those of the fourth embodiment will not be described. According to the first modification of the fourth embodiment, as illustrated in FIG. 16, the fourth reflection sheet 326d is arranged on the light exit surface 320b side of the light guide plate 320 to cover an opening of the groove 302d. The fourth reflection sheet 326d is arranged so that a reflection surface thereof faces the groove 320d and one end of the reflection sheet 326d is in contact with a front-surface side end of the first contact portion 336a of the heat dissipation member 336 and another end thereof is adjacent to one end of an optical member 318. Accordingly, the opening of the groove 320d is covered by the fourth reflection sheet 326d. According to such a configuration, light emitted from the LEDs 328 and directed toward the opening of the groove 320d is reflected by the fourth reflection sheet 326d toward the light entrance surface 320d1 of the light guide plate 320. Therefore, light entrance efficiency of light emitted from the LED 328 and being incident on the light entrance surface 320d1 is improved.

Second Modification of Fourth Embodiment

Figure 17:
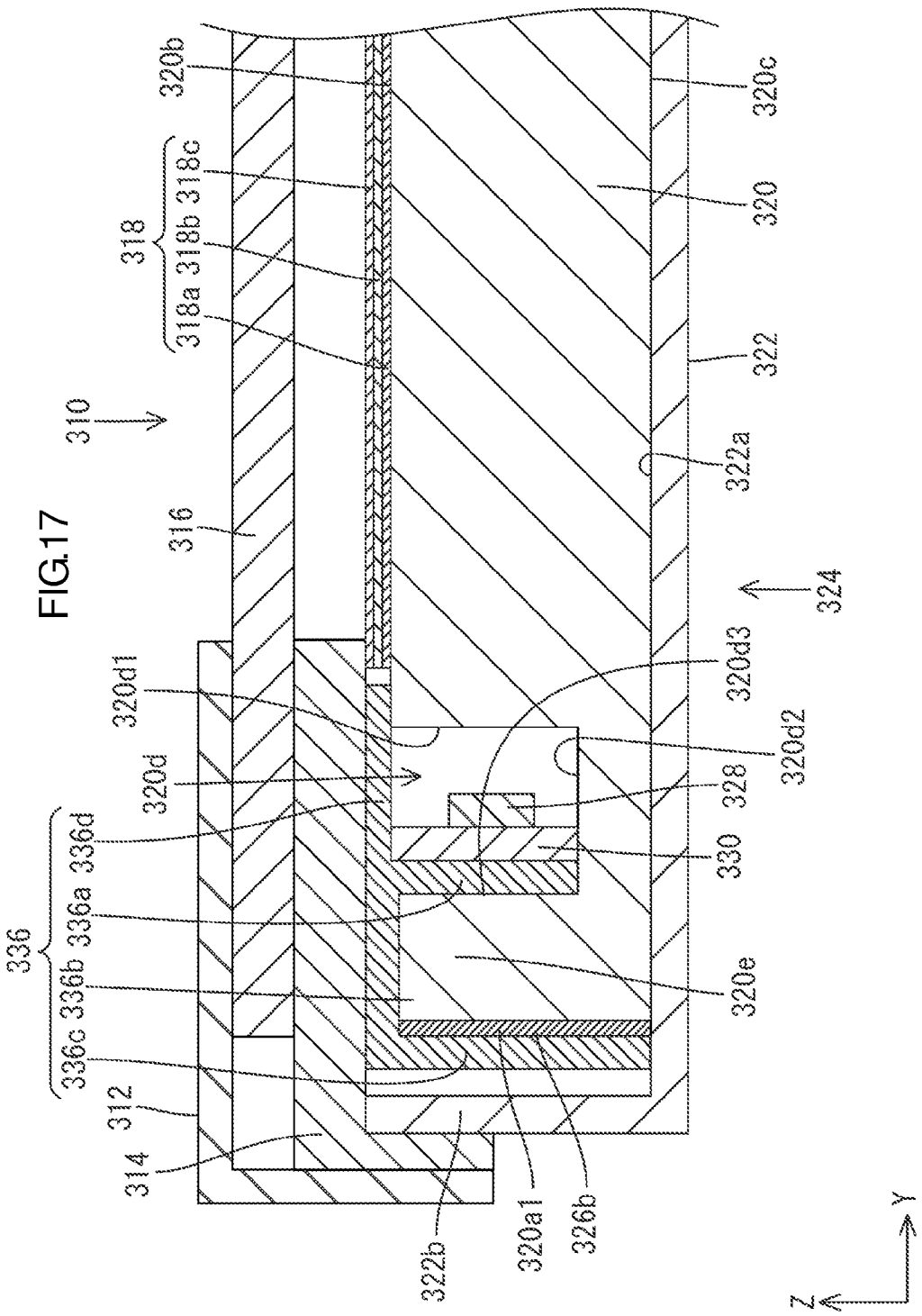
FIG. 17 is a cross-sectional view of a main part of the liquid crystal display device 310 according to a second modification of the fourth embodiment.

Next, a second modification of the fourth embodiment will be described. According to the second modification illustrated in FIG. 17, a configuration of a heat dissipation member 336 differs from that of the fourth embodiment. Other configurations are same as those in the fourth embodiment and therefore, the constructions, functions, and effects similar to those of the fourth embodiment will not be described. According to the second modification of the fourth embodiment, as illustrated in FIG. 17, a plate-like cover portion 336d extends from a connection portion between the first contact portion 336a and the connecting portion 336b of the heat dissipation member 336 toward the optical member 318. The cover portion 336d is molded integrally with the heat dissipation member 336 to be formed as a part of the heat dissipation member 336. The cover portion 336d extends so that an extended end thereof is in contact with the light exit surface 320b adjacent to the light entrance surface 320d1 and is close to one end of the optical member 318. As a result, the opening of the groove 320d is covered by the cover portion 336d. The configuration of the heat dissipation member 336 according to the second modification is same as that of the heat dissipation member 336 according to the second modification of the first embodiment. According to such a configuration, light emitted from LEDs 328 and directed toward the opening of the groove 320d reaches the cover portion 336d and the light directed toward the opening is less likely to leak outside the light guide plate 320 by the cover portion 336d.

Fifth Embodiment

Figure 18:
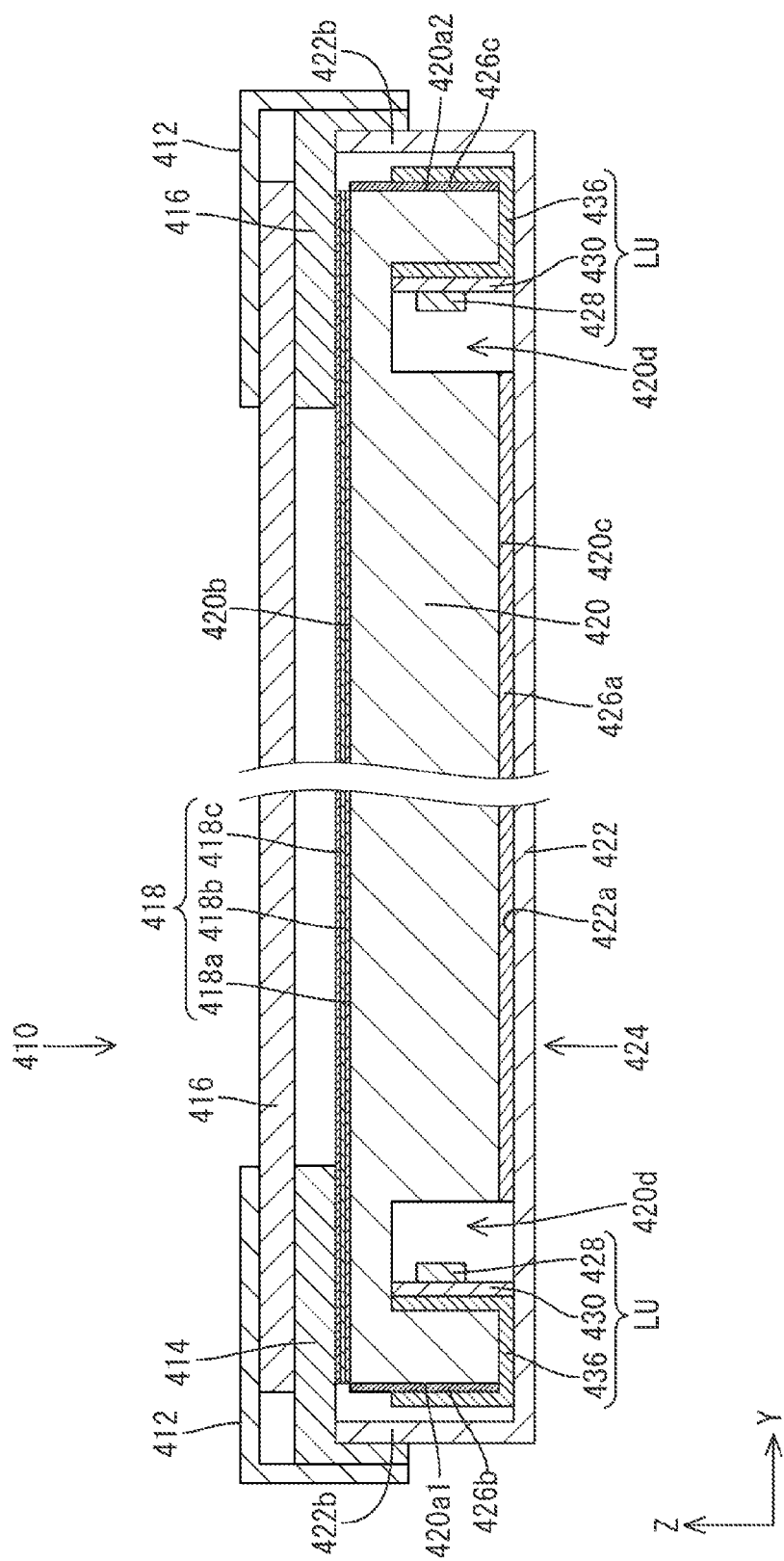
FIG. 18 is a cross-sectional view of a liquid crystal display device 410 according to a fifth embodiment.

A fifth embodiment will be described with reference to a drawing. The fifth embodiment differs from the first embodiment in that a light guide plate 420 has grooves 420d on two edge portions in a short-side direction of the light guide plate 420 (the Y-axis direction). Other configurations are same as those in the first embodiment and therefore, the constructions, functions, and effects similar to those of the first embodiment will not be described. In FIG. 18, components represented by numerals which four hundreds is added to the numerals in the first embodiment are same as those in the first embodiment.

In a backlight unit 424 according to the fifth embodiment, as illustrated in FIG. 18, the light guide plate 420 has the grooves 420d, 420d on two edge portions of the light guide plate 420 with respect to the short-side direction (the Y-axis direction), respectively. The groove 420d has a shape and a configuration same as those in the first embodiment. Two LED units LU are arranged in the grooves 420d, respectively such that LEDs 428 are opposed to respective light entrance surfaces 420d1 in the grooves 420d. In a configuration including a plurality of LED units LU, each of the LED units LU is retained in the corresponding groove 420d by providing grooves 420d corresponding to the respective LED units LU. Accordingly, in the configuration including a plurality of LED units LU, a distance between the LEDs 428 and each light entrance surface 420d1 is maintained constant regardless of occurrence of thermal expansion and thermal shrinkage of the light guide plate 420 or the variations in size precision of a chassis 422, and good optical properties are maintained.

Modifications of the above embodiments will be described.

(1) In the above embodiments, the heat dissipation member includes at least the first contact portion, the second contact portion, and the connecting portion. However, a shape and a configuration of the heat dissipation member may not be limited thereto as long as the heat dissipation member is configured to sandwich a part of the light guide plate.

(2) In the above embodiments, the second reflection sheet and the third reflection sheet are arranged on the respective long-side edge surfaces of the light guide plate so as to be in contact therewith. One or both of the long-side edge surfaces of the light guide plate may be coated with white to provide light reflectivity to the edge surface or the edge surfaces. In this configuration, the second contact portion of the heat dissipation member may be directly in contact with the edge surface of the light guide plate.

(3) The groove is open at two ends thereof in the direction in which the groove extends and the heat dissipation member is open at two ends thereof in the direction in which the heat dissipation member extends. According to such a configuration, the heat dissipation member is slid along the groove to be mounted on the light guide plate. At least one of the two ends of the groove in the direction in which the groove extends may be open and at least one of the two ends of the heat dissipation member in the direction in which the heat dissipation member extends may be open. In such a configuration, the heat dissipation member is mounted on the light guide plate from the opposite plate surface side or the light exit surface side of the light guide plate (configurations in the first embodiment, the fourth embodiment, the fifth embodiment, for example).

(4) Other than those in the above embodiments, the groove may be altered in the number, arrangement, shape, and configuration, if necessary.

(5) Other than those in the above embodiments, the heat dissipation member (holding member) may be altered in the number, shape, and configuration, if necessary.

(6) In the above embodiments, the liquid crystal display device includes the liquid crystal panel as the display panel. However, the technology described herein may be applied to display devices including other kinds of display panels.

(7) In the above embodiments, the television device includes the tuner. However, the technology can be applied to display devices without including a tuner.

The embodiments according to the present invention are described in detail only as examples. The present invention is not limited to the above embodiments explained in the above description and the drawings. The technology described herein may include modifications of the above embodiments.

The technical elements described in this specification and the drawings may be used independently or in combination to achieve the technical benefits. The combinations are not limited to those in claims. With the technologies described in this specification and the drawings, multiple objectives may be accomplished at the same time. However, the technical benefits can be achieved by accomplishing even only one of the objectives.

EXPLANATION OF SYMBOLS

TV: television device, Ca, Cb: cabinet, T: tuner, S: stand, 10, 110, 210, 310, 410: liquid crystal display device, 12, 112, 212, 312: bezel, 14, 114, 214, 314, 414: frame, 16, 116, 216, 316, 416: liquid crystal panel, 18, 118, 218, 318, 418: optical member, 20, 120, 220, 320, 420: light guide plate, 20*a*1, 120*a*1, 220*a*1, 320*a*1, 420*a*1: one edge surface, 20*a*2, 120*a*2, 220*a*2, 320*a*2, 420*a*2: another edge surface, 20*b*, 120*b*, 220*b*, 320*b*, 420*b*: light output surface, 20*c*, 120*c*, 220*c*, 320*c*, 420*c*: opposite surface, 20*d*, 120*d*, 220*d*, 320*d*, 420*d*: groove, 20*d*1, 120*d*1, 220*d*1, 320*d*1, 420*d*1: light entrance surface, 20*d*3, 120*d*3, 220*d*3, 4320*d*3, 420*d*3: opposite side surface, 22, 122, 222, 322, 422: chassis, 24, 124, 224, 324, 424: backlight unit, 26*a*, 126*a*, 226*a*, 326*a*, 426*a*: first reflection sheet, 26*a*1: extended portion, 26*b*, 126*b*, 226*b*, 326*b*, 426*b*: second reflection sheet, 26*c*, 126*c*, 226*c*, 326*c*, 426*c*: third reflection sheet, 326*d*: fourth reflection sheet, 28, 128, 228, 328, 428: LED, 30, 130, 230, 330, 430: LED board, LU: LED unit, 36, 136, 236, 336, 436: heat dissipation member, 36*a*, 136*a*, 236*a*, 336*a*, 436*a*: first contact portion, 36*b*, 136*b*, 236*b*, 336*b*, 436*b*: connecting portion, 36*c*, 136*c*, 236*c*, 336*c*, 436*c*: second contact portion, 36*d*, 336*d*: cover portion, 136*e*: third contact portion, 236*f*: extended portion

The invention claimed is:

1. A lighting device comprising:
a light guide plate having a plate shape, the light guide plate including a light exit surface on one plate surface thereof, an opposite surface on another plate surface thereof, a groove in one of the light exit surface and the opposite surface, the groove extending along an edge of a plate surface of the light guide plate, a light entrance surface on one inner side surface of the groove, and an opposite side surface on another inner side surface of the groove;
a holding member including a portion being in contact with the opposite side surface, and a portion being on a side of one edge surface of the light guide plate, the one edge surface being opposite to the opposite side surface having a part of the light guide plate between the one edge surface and the opposite side surface, and the holding member holding the part of the light guide plate between the portions thereof;
a light source board arranged on a surface of the portion of the holding member that is in contact with the opposite side surface, the light source board arranged on the surface that is opposite to a surface of the portion that is in contact with the opposite side surface; and
a light source arranged on the light source board with a light emission surface thereof facing the light entrance surface; wherein
the holding member includes a first contact portion being in contact with the opposite side surface, a second contact portion being in contact with one edge surface of the light guide plate, and a connecting portion connecting the first contact portion and the second contact portion;
the holding member further includes a cover portion extending from a connection portion between the first contact portion and the connecting portion to cover an opening of the groove;
the light guide plate and the light source mounted on the light source board are provided as an integral unit; and
the holding member is movable according to a thermal expansion or a thermal shrinkage of the light guide plate.

2. The lighting device according to claim 1, further comprising a first reflection sheet arranged to be in contact with the opposite plate surface, wherein the one edge surface of the light guide plate has light reflectivity.

3. The lighting device according to claim 2, further comprising a second reflection sheet between the one edge surface and the holding member, the second reflection sheet being in contact with the one edge surface of the light guide plate.

4. The lighting device according to claim 1, further comprising a third reflection sheet being in contact with another edge surface of the light guide plate, the other edge surface being an opposite to the one edge surface.

5. The lighting device according to claim 1, wherein
the holding member further includes a third contact portion that is in contact with a part of another one of the light exit surface and the opposite plate surface, the other one of the light exit surface and the opposite plate surface being a surface opposite to the one having the groove.

6. The lighting device according to claim 5, further comprising an optical member on the light exit surface, wherein
the opposite plate surface has the groove, and
the holding member further includes an extended portion extending from a part of the third contact portion toward a side opposite to the second contact portion, and
the optical member has a fitting recess on a portion thereof corresponding to the extended portion so as to be fitted to the extended portion.

7. A lighting device comprising:
a light guide plate having a plate shape, the light guide plate including a light exit surface on one plate surface thereof, an opposite surface on another plate surface thereof, a groove in one of the light exit surface and the opposite surface, the groove extending along an edge of a plate surface of the light guide plate, a light entrance surface on one inner side surface of the groove, and an opposite side surface on another inner side surface of the groove;

a holding member including a portion being in contact with the opposite side surface, and a portion being on a side of one edge surface of the light guide plate, the one edge surface being opposite to the opposite side surface having a part of the light guide plate between the one edge surface and the opposite side surface, and the holding member holding the part of the light guide plate between the portions thereof;

a light source board arranged on a surface of the portion of the holding member that is in contact with the opposite side surface, the light source board arranged on the surface that is opposite to a surface of the portion that is in contact with the opposite side surface; and a light source arranged on the light source board with a light emission surface thereof facing the light entrance surface; wherein the holding member includes a first contact portion being in contact with the opposite side surface, a second contact portion being in contact with one edge surface of the light guide plate, and a connecting portion connecting the first contact portion and the second contact portion;

the opposite plate surface has the groove;

the first reflection sheet extends to cover an opening of the groove;

the light guide plate and the light source mounted on the light source board are provided as an integral unit; and the holding member is movable according to a thermal expansion or a thermal shrinkage of the light guide plate.

8. A lighting device comprising:

alight guide plate having a plate shape, the light guide plate including a light exit surface on one plate surface thereof, an opposite surface on another plate surface thereof, a groove in one of the light exit surface and the opposite surface, the groove extending along an edge of a plate surface of the light guide plate, a light entrance surface on one inner side surface of the groove, and an opposite side surface on another inner side surface of the groove;

a holding member including a portion being in contact with the opposite side surface, and a portion being on a side of one edge surface of the light guide plate, the one edge surface being opposite to the opposite side surface having a part of the light guide plate between the one edge surface and the opposite side surface, and the holding member holding the part of the light guide plate between the portions thereof;

a light source board arranged on a surface of the portion of the holding member that is in contact with the opposite side surface, the light source board arranged on the surface that is opposite to a surface of the portion that is in contact with the opposite side surface;

a light source arranged on the light source board with a light emission surface thereof facing the light entrance surface; and a fourth reflection sheet covering the opening of the groove; wherein the holding member includes a first contact portion being in contact with the opposite side surface, a second contact portion being in contact with one edge surface of the light guide plate, and a connecting portion connecting the first contact portion and the second contact portion;

the light guide plate and the light source mounted on the light source board are provided as an integral unit; and the holding member is movable according to a thermal expansion or a thermal shrinkage of the light guide plate.

9. The lighting device according to claim 1, wherein:

the holding member slidably moves in a direction in which the groove extends;

the light source and the light source board are not attached to a casing; and the light source and the light source board are attached to the light guide plate.

10. The lighting device according to claim 1, wherein the holding member has heat dissipation property.

11. A display device comprising:

the lighting device according to claim 1; and a display panel displaying with using light from the lighting device.

12. The display device according to claim 11, wherein the display panel is a liquid crystal panel including a pair of substrates and liquid crystals enclosed therebetween.

13. A television device comprising the display device according to claim 11.

14. The lighting device according to claim 7, further comprising a first reflection sheet arranged to be in contact with the opposite plate surface, wherein the one edge surface of the light guide plate has light reflectivity.

15. The lighting device according to claim 14, further comprising a second reflection sheet between the one edge surface and the holding member, the second reflection sheet being in contact with the one edge surface of the light guide plate.

16. The lighting device according to claim 15, further comprising a third reflection sheet being in contact with another edge surface of the light guide plate, the other edge surface being an opposite to the one edge surface.

17. The lighting device according to claim 7, wherein the holding member further includes a third contact portion that is in contact with a part of another one of the light exit surface and the opposite plate surface, the other one of the light exit surface and the opposite plate surface being a surface opposite to the one having the groove.

18. The lighting device according to claim 17, further comprising an optical member on the light exit surface, wherein the opposite plate surface has the groove, and the holding member further includes an extended portion extending from a part of the third contact portion toward a side opposite to the second contact portion, and the optical member has a fitting recess on a portion thereof corresponding to the extended portion so as to be fitted to the extended portion.

19. The lighting device according to claim 7, wherein the holding member slidably moves in a direction in which the groove extends.

* * * * *